United States Patent
Osofsky

(10) Patent No.: US 10,643,355 B1
(45) Date of Patent: May 5, 2020

(54) GRAPHICAL REPRESENTATION OF FRAME INSTANCES AND CO-OCCURRENCES

(71) Applicant: NetBase Solutions, Inc., Santa Clara, CA (US)

(72) Inventor: Michael Jacob Osofsky, Palo Alto, CA (US)

(73) Assignee: NetBase Solutions, Inc., Santa Clara, CA (US)

( * ) Notice: Subject to any disclaimer, the term of this patent is extended or adjusted under 35 U.S.C. 154(b) by 0 days.

(21) Appl. No.: 15/653,370

(22) Filed: Jul. 18, 2017

Related U.S. Application Data

(63) Continuation of application No. 13/676,073, filed on Nov. 13, 2012, now abandoned, which is a continuation-in-part of application No. 13/176,713, filed on Jul. 5, 2011, now Pat. No. 9,390,525.

(51) Int. Cl.
*G06T 11/20* (2006.01)

(52) U.S. Cl.
CPC ............ *G06T 11/20* (2013.01); *G06T 11/206* (2013.01)

(58) Field of Classification Search
CPC .................................................. G06T 11/206
See application file for complete search history.

(56) References Cited

U.S. PATENT DOCUMENTS

| | | | |
|---|---|---|---|
| 5,694,523 A | 12/1997 | Wical | |
| 5,940,821 A | 8/1999 | Wical | |
| 5,963,940 A | 10/1999 | Liddy et al. | |
| 6,202,064 B1 | 3/2001 | Julliard | |
| 6,675,159 B1 | 1/2004 | Lin et al. | |
| 6,774,899 B1 | 8/2004 | Ryall et al. | |
| 7,302,383 B2 | 11/2007 | Valles | |
| 7,496,593 B2 | 2/2009 | Gardner et al. | |
| 7,779,007 B2 | 8/2010 | West et al. | |
| 7,805,302 B2 | 9/2010 | Chelba et al. | |
| 8,046,348 B1 | 10/2011 | Rehling et al. | |
| 8,055,608 B1 | 11/2011 | Rehling et al. | |

(Continued)

OTHER PUBLICATIONS

Gautam et al., published Feb. 17, 2008 (y/m/d), pp. 2040-2042. "Document Retrieval Based on Key Information of Sentence," IEEE ICACT.

Huang et al., published Sep. 7, 1998 (y/m/d), pp. 623-645. "On-line Animated Visualization of Huge Graphs using a Modified Spring Algorithm," Journal of Visual Languages & Computing 9.

Ku et al., published Mar. 27, 2006 (y-m-d), 8 pgs. "Opinion Extraction, Summarization and Tracking in News and Blog Corpora," AAAI Spring Symposium Series 2006.

(Continued)

*Primary Examiner* — Ryan McCulley
(74) *Attorney, Agent, or Firm* — Kaplan IP Law, PLLC; Jonathan T. Kaplan

(57) ABSTRACT

Occurrence and co-occurrence data can be presented as a graph. A Non-directional Co-occurrence Graph represents occurrences of an item x as a node and co-occurrences, of items x and y, as an edge between the nodes for x and y. The size of a node can depend on the log, or a scaled value, of its occurrences. A Directional Co-occurrence Graph is the same as a Non-directional Co-occurrence Graph, except there can be, between each pair of nodes, up to two directed edges. An edge pointing from x to y can be used to represent the following ratio: number of co-occurrences of x and y divided by the number of occurrences of x. More specifically, the thickness of the edge can be proportional to the ratio. Net sentiment can be determined for an item x and used to modify the graphical representation (e.g., the color) of a node or edge.

11 Claims, 19 Drawing Sheets

(56) References Cited

U.S. PATENT DOCUMENTS

| | | |
|---|---|---|
| 2002/0091671 A1 | 7/2002 | Prokoph |
| 2003/0172061 A1 | 9/2003 | Krupin et al. |
| 2004/0044952 A1 | 3/2004 | Jiang et al. |
| 2004/0078190 A1 | 4/2004 | Fass et al. |
| 2004/0150644 A1* | 8/2004 | Kincaid ................ G06F 3/0481 345/440 |
| 2005/0149494 A1 | 7/2005 | Lindh et al. |
| 2005/0165600 A1 | 7/2005 | Kasravi et al. |
| 2006/0031195 A1 | 2/2006 | Patterson |
| 2007/0156677 A1 | 7/2007 | Szabo |
| 2009/0112892 A1 | 4/2009 | Cardie et al. |
| 2009/0306967 A1 | 12/2009 | Nicolov et al. |
| 2009/0319517 A1 | 12/2009 | Guha et al. |
| 2009/0327259 A1 | 12/2009 | Smith |
| 2010/0063785 A1 | 3/2010 | Pich et al. |
| 2010/0145771 A1 | 6/2010 | Fligler et al. |
| 2011/0037766 A1 | 2/2011 | Judy et al. |
| 2011/0161071 A1 | 6/2011 | Duong-van |
| 2013/0135314 A1 | 5/2013 | Haggerty et al. |
| 2015/0293997 A1 | 10/2015 | Smith et al. |

OTHER PUBLICATIONS

Ruppenhofer et al., published Aug. 25, 2006 (y/m/d), 166 pages. "FrameNet II: Extended Theory and Practice," International Computer Science Institute, University of California at Berkeley, USA.

Schwing, Kyle M., published Sep. 1, 2009 (y/m/d), "The Flux Measure of Influence in Engineering Networks," Master's Thesis, Dept. of ME, MIT.

Sheard, Tim, published 2009, "Graphs in Computer Science," Portland State University, 12 pgs.

Wu, Tianhaow et al., published May 3, 2003 (y/m/d), 12 pgs. "A Supervised Learning Algorithm for Information Extraction From Textual Data," Proceedings of the Workshop on Text Mining, Third SIAM International Conference on Data Mining.

Zadrozny, Slawomir et al., published 2003, 5 pgs. "Linguistically quantified thresholding strategies for text categorization," Systems Research Institute, Polish Academy of Sciences, Warszawa, Poland.

Zhang et al., published Jun. 22, 2010 (y/m/d), 10 pgs. "Voice of the Customers: Mining Online Customer Reviews for Product Feature-based Ranking," Proceedings of the 3rd Wonference on Online social networks (WOSN '10). USENIX Association, Berkeley, CA, USA.

\* cited by examiner

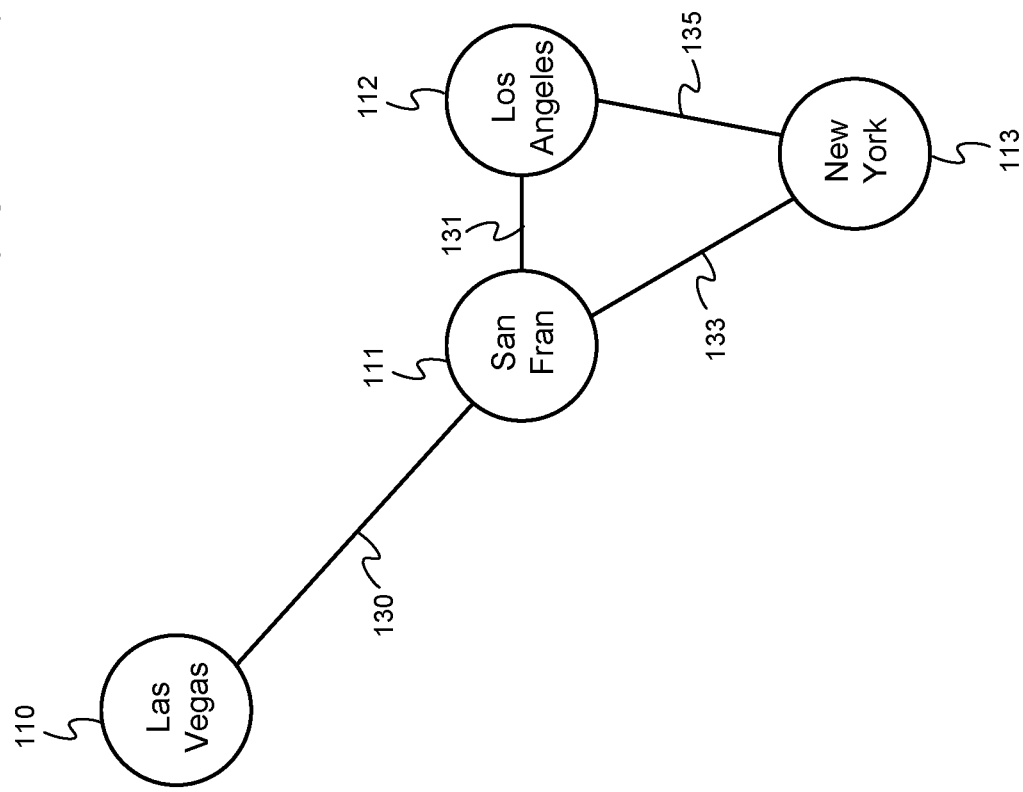

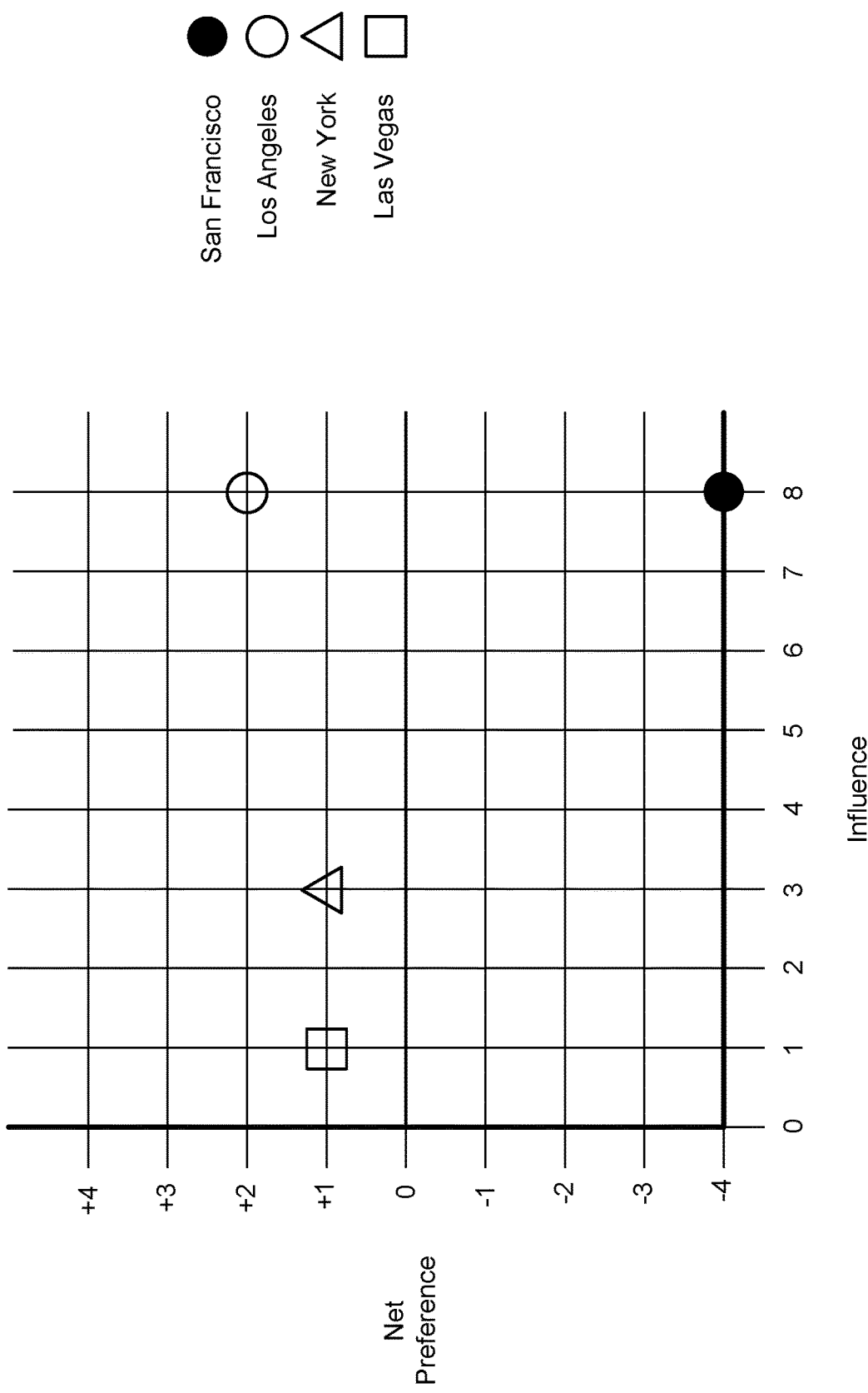

FIGURE 2A
Example Corpus

SNIPPET 201 (SF over LA):
    According to a soon to be released report from Environment California, San Francisco has the largest amount of solar rooftops per capita of any large California city. Currently, San Francisco has 1,350 solar roofs totaling 7,050 mw of solar power, ranking San Francisco third, behind Los Angeles and San Diego, in terms of sheer numbers of solar roofs. <u>But, on a per capita basis, San Francisco has approximately six times more solar roofs than Los Angeles, despite Southern California receiving more sun.</u> "The success of our solar energy incentive program in just its first year has helped catapult San Francisco into a leading solar city in California," said SFPUC General Manager Ed Harrington. "GoSolarSF is proof that, with fiadded incentives, people will enthusiastically embrace solar power and give a boost to California's environment and economy."

Source: http://www.sfha.org/news/pdf/07_07_09_SFHA_Solar_Panels_Press_Release.pdf SNIPPET 202 (SF over LA):
    * Hundreds of media stories will be shared internationally about San Francisco, which will attract visitors. * Provide local independent filmmakers the opportunity to forge co-production relationships with their global counterparts, which will bring hundreds of thousands of dollars in production and post-production expenditures to San Francisco. (<u>San Francisco has more independent filmmakers than Los Angeles and New York.</u>) * Bring repeat visitors. Conference attendees will likely visit San Francisco again.

Source: https://netaonline.org/JudyTamINPUT2005.pdf

SNIPPET 203 (LA over SF):
    He lost a second bid for governor in 1986. The five-term mayor (1973-93) was credited with opening city government to minorities and women, expanding social services to the urban poor, and spurring economic growth. <u>Under his administration, Los Angeles surpassed San Francisco as the West Coast's economic power in Pacific Rim trading, symbolized by the downtown skyline that grew during his administration.</u> The successful 1984 Olympic Games stood out as his crowning achievement. The economic ruin and traffic gridlock many feared never materialized.

Source: http://www.rulers.org/indexb5.html

FIGURE 2B
Example Corpus (cont)

SNIPPET 204 (LA over SF):
<u>I hate to say it, but Los Angeles has better sushi than San Francisco.</u> Sure, the Bay Area has a smattering of top notch sushi bars, but in L.A. you can go to a random strip mall.

Source: http://www.bunrab.com/dailyfeed/2007February/dailyfeed_february-07_p2.html SNIPPET 205 (LA over SF):
So, who's moving in? A close analysis of the 2000 census finds that the area continues to attract large numbers of well-educated, younger residents. <u>Even Los Angeles has surprisingly outperformed such cities as San Francisco and San Jose in the years between 1995 and 2004</u>. How does this affect Santa Monica? It's a highly sought-after residential city within the Los Angeles area.

Source: http://www.lwvsantamonica.org/files/traffic.pdf

SNIPPET 206 (LA over SF):
But the promise of international commerce on a grand scale would be delayed until the end of the World War I. The 1920s, marked by a boom in petroleum, lumber and citrus trade, was a period of dynamic growth for the Port of Los Angeles. <u>For the first time in history, Los Angeles surpassed San Francisco as the West Coast's busiest seaport and ranked second only to New York in foreign export tonnage</u>. In the peak year of 1928, the Port handled 26.5 million tons of cargo -- a record that would stand for nearly 40 years. The Great Depression caused cargo tonnage to slump severely, and the Port did not pass 20 million tons again until 1937.

Source: http://www.portoflosangeles.org/history/cabrillo.asp

SNIPPET 207 (LA over NY):
"If you cut open my stomach, you'll see giant globs of hydronated purple stuff." * Is a huge old movie buff and stops at 1962 (after Doris Day, she says). * <u>Overall prefers Los Angeles to New York City - although she loved living on Charles Street in the West Village, while dating Men's Health editor-in-chief Dave Zinczenko</u>. She isn't a fan of the cold weather - or all the snobs: "I just hate it, I can't bear it. I find it to be as small-minded as any other small-minded town.

Source: http://www.rose-mcgowan.com/information/trivia.php

FIGURE 2C
Example Corpus (cont)

SNIPPET 208 (NY over LA):
<u>New York City has a higher number of Asian same-sex households than San Francisco or Los Angeles, according to a report released yesterday</u>. The report, analyzing Census 2000 data, showed that 17,163 same-sex households in the United States were headed by an Asian. They represent 0.5 percent of all Asian households.

Source: http://www.gaypasg.org/GayPASG/PressClippings/2004/March%25202004/NYC%2520has%2520high%2520number%2520of%2520Asian%2520same-sex%2520households.htm SNIPPET 209 (NY over SF):
I arrived in a boiling NYC, the weather as fabulous as I left it 32 days previously. Looking back, the west coast was nothing compared to the east. <u>I much preferred New York to LA or San Francisco, which surprised me greatly</u>. My hotel was in the Murray Hill area, mid-town and a perfect location.

Source: http://www.americansc.org.uk/Online/Helens_Trek_America.htm

SNIPPET 210 (LV over SF):
In upcoming campaigns, the Las Vegas Convention and Visitors Authority (LVCVA) plans to punctuate its marketing programs with the launch of a multi-faceted campaign specifically targeting the gay and lesbian traveler. "Millions of gay and lesbian travelers are drawn to Las Vegas each year because they crave the Las Vegas experience," says Terry Jicinsky, senior vice president of marketing, LVCVA. <u>"The fact Las Vegas beat out San Francisco, which was once thought of as the preferred destination for this market, shows Las Vegas is making great strides in attracting a diverse audience."</u> Las Vegas offers a multitude of once-in-a-lifetime experiences, including the hottest gourmet restaurants by celebrity chefs including Bobby Flay, Hubert Keller, Rick Moonen and Daniel Boulud, as well as unparalleled headliners and productions year-round such as "MAMMA MIA!" at Mandalay Bay, "Jubilee!" at the Tropicana and Celine Dion's "A New Day ...

Source: http://www.lasvegastravelmagazine.com/content/view/177/39/

Example Instances For Graphing

FIGURE 3B
Example Instances For Graphing (cont)

307

| ITEM | New York |
|---|---|
| PREF ITEM | Los Angeles |

308

| ITEM | San Francisco |
|---|---|
| PREF ITEM | New York |

309

| ITEM | Los Angeles |
|---|---|
| PREF ITEM | New York |

310

| ITEM | San Francisco |
|---|---|
| PREF ITEM | Las Vegas |

Example Instances For Graphing

FIGURE 5A

PREFERENCE FRAME: EXAMPLE RULE

500

1. PREFER_A_OVER_B_Rule

2. Root_node: PREFER --> no_role
3.     Undergoer: ANY_LEX_UNIT --> PREFERRED_ITEM_ROLE
4.     Complement: Prep(OVER)... NP --> ITEM_ROLE

FIGURE 5B

EXAMPLE SENTENCE FOR CONVERSION TO LOGICAL FORM

501

"I actually prefer BFTiE way over TBE."

FIGURE 5C

LOGICAL FORM FROM SEMANTIC PARSER

502

1. "prefer"
2.     Actor: I
3.     Undergoer: BFTiE
4.     Complement: way over TBE

FIGURE 5D

PREFERENCE FRAME INSTANCE

503

1. ITEM_ROLE: way over TBE
2. PREFERRED_ITEM_ROLE: BFTiE

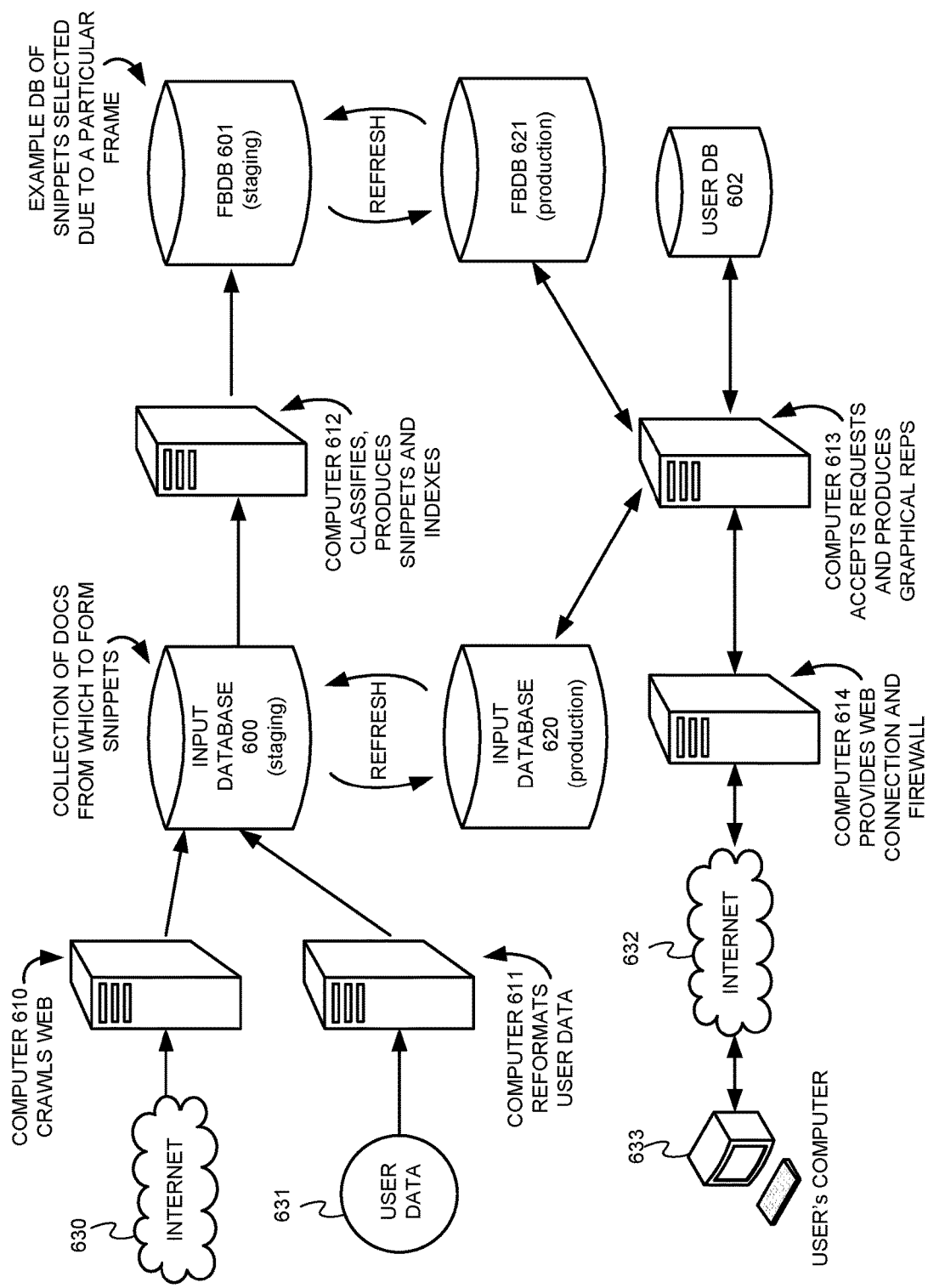

GRAPHICAL REPRESENTATION OF FRAME INSTANCES AND CO-OCCURRENCES

As provided for under 35 U.S.C. § 120, this patent claims benefit of the filing date of the following U.S. patent application, herein incorporated by reference in its entirety:

"Graphical Representation of Frame Instances and Co-occurrences," filed 2012 Nov. 13 (y/m/d), having inventor Michael Jacob Osofsky, and App. No. 13676073 ("the '073 Application").

The '073 Application is, itself, under benefit of 35 U.S.C. § 120, a continuation-in-part application of application Ser. No. 13/176,713, filed 2011 Jul. 5 (y/m/d).

CROSS REFERENCE TO RELATED APPLICATIONS

This application is related to the following U.S. patent application(s), that are herein incorporated by reference in their entirety:

"Method and Apparatus For Frame-Based Search," filed 2008 Jul. 21 (y/m/d), having inventors Wei Li, Michael Jacob Osofsky and Lokesh Pooranmal Bajaj and application Ser. No. 12/177,122 ("the '122 Application");

"Method and Apparatus For Frame-Based Analysis of Search Results," filed 2008 Jul. 21 (y/m/d), having inventors Wei Li, Michael Jacob Osofsky and Lokesh Pooranmal Bajaj and application Ser. No. 12/177,127 ("the '127 Application");

"Method and Apparatus For Automated Generation of Entity Profiles Using Frames," filed 2010 Jul. 20 (y/m/d), having inventors Wei Li, Michael Jacob Osofsky and Lokesh Pooranmal Bajaj and application Ser. No. 12/839,819 ("the '819 Application");

"Method and Apparatus For HealthCare Search," filed 2010 May 30 (y/m/d), having inventors Jens Erik Tellefsen, Michael Jacob Osofsky, and Wei Li and application Ser. No. 12/790,837 ("the '837 Application");

"Method and Apparatus For Determining Search Result Demographics," filed 2010 Apr. 22 (y/m/d), having inventors Michael Jacob Osofsky, Jens Erik Tellefsen, Wei Li, and Ranjeet Singh Bhatia and App. Ser. No. 12/765,848 ("the '848 Application");

"Graphical Representation of Frame Instances," filed 2011 Jul. 5 (y/m/d), having inventor(s) Michael Jacob Osofsky and application Ser. No. 13/176,713 ("the 713 Application");

"Methods and Apparatuses for Clustered Storage of Information and Query Formulation," filed 2011 Oct. 24 (y/m/d), having inventors Mark Edward Bowles, Jens Erik Tellefsen, and Ranjeet Singh Bhatia and application Ser. No. 13/280,294 ("the '294 Application"); and "Methods and Apparatuses for Sentiment Analysis," filed 2012 May 14 (y/m/d), having inventors Lisa Joy Rosner, Jens Erik Tellefsen, Michael Jacob Osofsky, Jonathan Spier, Ranjeet Singh Bhatia, Malcolm Arthur De Leo, and Karl Long and application Ser. No. 13/471,417 ("the '417 Application").

Collectively, the above-listed related applications can be referred to herein as "the Related Applications."

FIELD OF THE INVENTION

The present invention relates generally to graphical representations of frame instances or co-occurrences, and more particularly to representing instances or co-occurrences produced as a result of applying linguistic analysis to a corpus of natural language.

BACKGROUND OF THE INVENTION

Vast amounts of opinion data is now available on the Internet, through a wide range of web sites that permit users to provide input, and the amount of such opinion data continues to increase rapidly. For example, customers are using online tools to express their opinions about a wide range of products and services. Many such online tools can be described as being under the general category of "Social Media" (or SM). Online tools in this category include, but are not limited to, the following:
- FACEBOOK, Inc. (Menlo Park, Calif., U.S.A.)
- TWITTER, Inc. (San Francisco, Calif., U.S.A.)
- all variety of "web logs" or "blogs"
- all variety of "Web 2.0" sites, that facilitate feedback from a site's audience or readers This opinion data could be of great use, beyond the particular web site for which it was created, if it could be "harvested" (or collected) and summarized in a useful way. For example, with regard to a brand "x" of consumer products, a brand manager (a person responsible for the continued success of brand "x," in a management or marketing role) has a great interest in knowing:
- what people think about brand "x" in relation to other brands
- the sentiment of consumers toward brand "x" and towards other, competitive brands It would therefore be highly desirable to provide a system that can process and summarize opinion data in an automated way.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 1C represents the set of all edges, between a pair of nodes of FIG. 1B, by a single edge, for purposes of the determination of an attractive force.

FIG. 1E illustrates an example Instance Plot.

FIGS. 2A-2C illustrate example "snippets," collected from a variety of online sources.

FIGS. 3A-3B show a corresponding Preference Frame instance, for each snippet of FIGS. 2A-2C.

FIG. 5A shows an example frame extraction rule 500 for producing instances of the Preference Frame.

FIG. 5B shows an example input sentence 501, that is converted into a representation called "Logical Form."

FIG. 5C show an example Logical Form, produced from the example input sentence of FIG. 5B.

FIG. 5D show an example instance, produced the Logical Form of FIG. 5C being tested against the frame extraction rule FIG. 5A.

FIG. 6 depicts an example production-level computer system design in which the techniques described herein can be applied.

DETAILED DESCRIPTION OF PREFERRED EMBODIMENTS

Figure 1A:
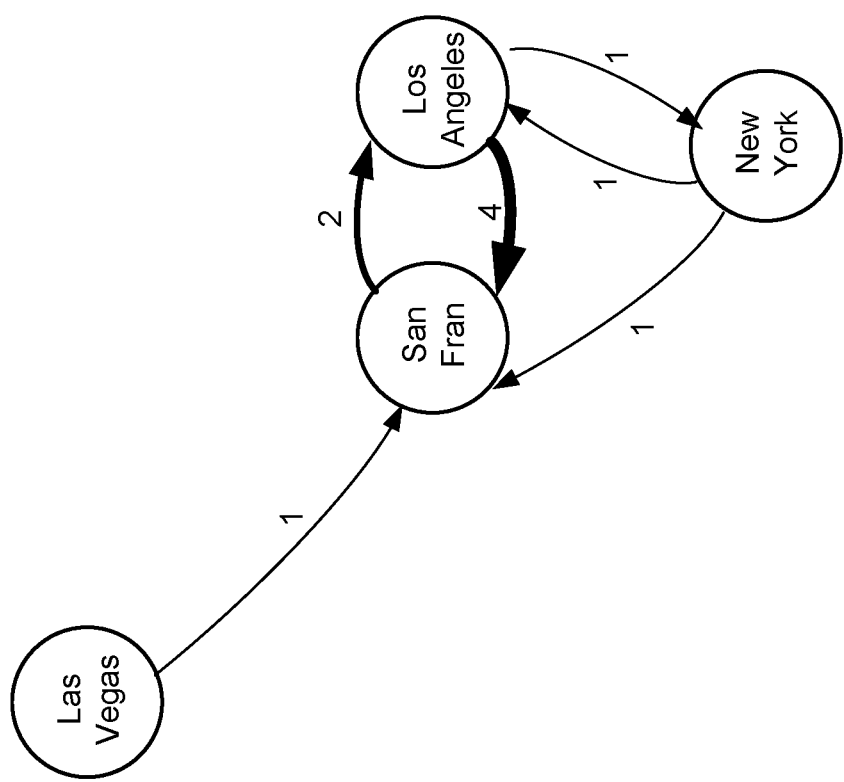
FIG. 1A depicts an example Instance Graph.

Reference will now be made in detail to various embodiments of the invention, examples of which are illustrated in the accompanying drawings. Wherever possible, the same reference numbers will be used throughout the drawings to refer to the same or like parts.

Please refer to Section 5 below ("Glossary of Selected Terms") for the definition of selected terms used below.

Table of Contents to Detailed Description 1 introduction
2 Frame Instance Graphs
   2.1 Introduction
   2.2 Instance Graph
   2.3 Instance Plot
   2.4 Additional Uses
3 Co-occurrence Graphs
   3.1 Introduction
   3.2 Non-directional Co-occurrence Graph
   3.3 Focusing on a Sub-Graph
   3.4 Dynamic Characteristics
   3.5 Directional Co-occurrence Graph
   3.6 Viewing Considerations
   3.7 Adding Other Data
   3.7.1 Frame Instance Data
   3.7.2 Document Demographics
   3.7.3 Instance Graphs
4 Additional Information
   4.1 Item Definitions
   4.2 Computing Environment
5 Glossary of Selected Terms

1 Introduction

In addition to being incorporated by reference in their entirety, the description presented herein specifically relies on many sections of the Related Applications. A specific Related Application can be referred to as "the '123 Application," where '123 is the last three digits of the Application Number of a Related Application A specific section of a Related Application can also be referenced herein, wherein acceptable formats, for such references, include any of the following:

Section X of the '123 Application
Section X, '123 Application
Section X, '123
Section X, '123 ("Title")
Section X, '123, "Title"

Where:
'123 is the last three digits of the Application Number of the Related Application being referenced;
"X" is the number of a section, as it is numbered within an Application '123; and
"Title" is the title of the section referenced (optional).

Figures of Related Application can be referred to herein, wherein an acceptable format, for such references, can include the following:

Figure X, '123

Where:
"X" is a figure number a '123 Application.

Understanding the present inventions can be aided by an understanding of "frames," "instances," and Frame-Based Search Engines (or FBSE's). Towards that end, the description presented herein relies on many parts of the '837 Application.

Section 4, '837 ("FBSE") describes a generic FBSE.

Within Section 4.2, the '837 Application discusses:
frames as a form of concept representation (Section 4.2.1)
the use of frame extraction rules to produce instances of frames (Section 4.2.2) when applied to a Source Corpus of natural language, and
the importance of pre-query processing, as a time when a "Frame-Based Database" (FBDB), of "snippets," can be produced (Section 4.3.2).

A pseudo-code format for frame extraction rules is presented in Section 6.2, '837 ("Frame Extraction Rules").

Snippets are discussed in Section 6.4, '837.

The FBDB is typically an Inverted Index Database (or IIDB).

As discussed in the '294 Application and the '417 Application, such IIDB can be organized into hierarchical clusters. As discussed in these applications, the clusters can be organized into a four level hierarchy where a zero is assigned to the highest level, and each successive level is incremented by one. The four levels discussed are:
Snippet: 0
Sentence: 1
Instance: 2
Role: 3

Each level of the hierarchy can be given its own "class" of record, and each such class can be accessible by its own selection of indexed fields. An example class structure follows:

1. SnippetObj: Each record of type "SnippetObj" represents a snippet. Permits searching, by snippet content, at an indexed field called "Snippet."
   1.1. SentenceObj: Each record of type "SentenceObj" represents a sentence of its parent snippet.
   Permits searching, by sentence content, at an indexed field called "Sentence."
   Permits searching, for the focus sentence, at an indexed field called "Focus." The content of the "Focus" field can be either "True" or "False."
      1.1.1. InstanceObj: Each record of type "InstanceObj" represents an instance, for each frame found in its parent sentence. Permits searching, by frame type, at an indexed field called "FrameType."
         1.1.1.1. RoleObj: Each record of type "RoleObj" represents a role of its parent instance. Permits searching, by role value content, at indexed field "Value."

The '294 and '417 Applications describe the searching of a database that includes the collection, in a large scale and comprehensive way, of postings (such as "tweets" on TWITTER) to Social Media (SM) web sites or services. Such a Social Media inclusive database is referred to as "SM_db," and its basic elements are called documents (even though, in Social Media, an individual posting may be quite short).

For purposes of explaining graphical representations of co-occurrences, a slightly modified class structure, to that shown above, is herein introduced. The class structure, called herein "document-based," can be the same as that shown above, except "SnippetObj" is replaced with "DocumentObj." Thus, for example, the following class structure results:
  1. DocumentObj: Each record of type "DocumentObj" represents an input document, of the document corpus that is to be subjected to linguistic analysis. Permits searching, by document content, at an indexed field called "Document."
    1.1. SentenceObj: (same as shown above)
      1.1.1. InstanceObj: (same as shown above)
        1.1.1.1. RoleObj: (same as shown above)

Through use of the "DocumentObj" and "SnippetObj" levels, snippets can still be identified. For example, SnippetObj.Focus can be used to identify each focus sentence found in its parent DocumentObj. Depending upon the size of the snippet desired, ±n sentences, surrounding each focus sentence, can be found. The value of n can be 0 or any positive integer. The values of n discussed, in the Related Applications, are 1 (for a total snippet size of 3 sentences) or 2 (for a total snippet size of 5 sentences).

As used herein, "frame instance data" refers to any collection of instances produced by the application of frame extraction rules to a corpus of natural language. Frame instance data can be produced in a wide variety of ways, some of which are discussed in the Related Applications.

A system that produces frame instance data is referred to herein, generically, as a "frame instance system." Two example frame instance systems are presented in the next section (Section 2, "Frame Instance Graphs"). Section 3 ("Co-occurrence Graphs") presents systems that rely, primarily, on co-occurrence data.

2 Frame Instance Graphs

2.1 Introduction

However frame instance data is produced, a graphical representation, of the frame instance data, can be very useful to persons seeking to better understand it. In general, such graphical representations can be referred to as "frame instance graphs." In the following two sub-sections, two types of frame instance graphs are introduced:
  Instance Graph (Section 2.2)
  Instance Plot (Section 2.3)

Each of the following sub-sections explains one of these graphical representations through an example usage scenario. The usage scenario is as follows: a person or organization seeking to better understand preferences between "items" of a certain category. In this context, "item" is understood very broadly ("item" is defined below in Section 4.1, "Item Definitions").

A more specific example is the study of consumer-preferences between brands, where the brands all relate to a same category of product or service. Some example product categories (in no way intended to be limiting) follow:
  Soft drinks
  Disposable diapers
  Cell phones An important commonality, to each category of product or service, is that it represent a competitive market, so that persons or organizations, with marketing and/or brand-management responsibilities, have an interest in understanding customer preferences.

Figure 4:
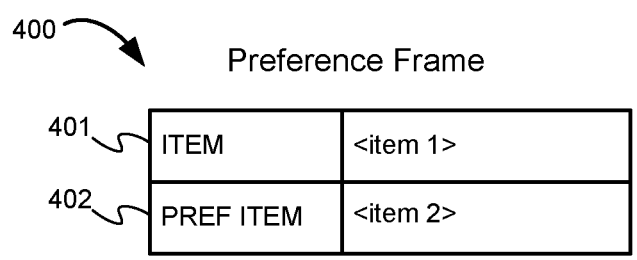
FIG. 4 shows an example Preference Frame.

To accomplish the production of frame instance data regarding items within a category, from a corpus of natural language such as online opinion data, a "Preference Frame" is introduced. An example Preference Frame 400 is shown in FIG. 4. It consists of two roles (or attributes) 401 and 402 called, respectively, "Item" and "Preferred Item." Frame extraction rules are written so that when a preference for one item over another is expressed, in a corpus of natural language, the following occurs:
  The preferred item, represented by <item 2>, is assigned to the role
  "Preferred Item."
  The item with respect to which <item 2> is preferred, represented by <item 1>, is assigned to the role "Item."

Another specific example where the Preference Frame can be useful, and that is addressed in detail herein, is the following category: major cities of the USA. For purposes of a simplified example, only the following 4 cities are considered:
  1. Las Vegas
  2. Los Angeles
  3. New York
  4. San Francisco An example collection of data about the 4 above-listed example cities, that has been collected from a variety of online sources, is shown in FIGS. 2A-2C. These figures depict 10 "snippets", numbered 201-210. Each snippet includes the URL at which it was collected. ("Snippets," discussed further below, are also defined in Section 6.4, '837, "Snippet Formation.")

Figure 3A:
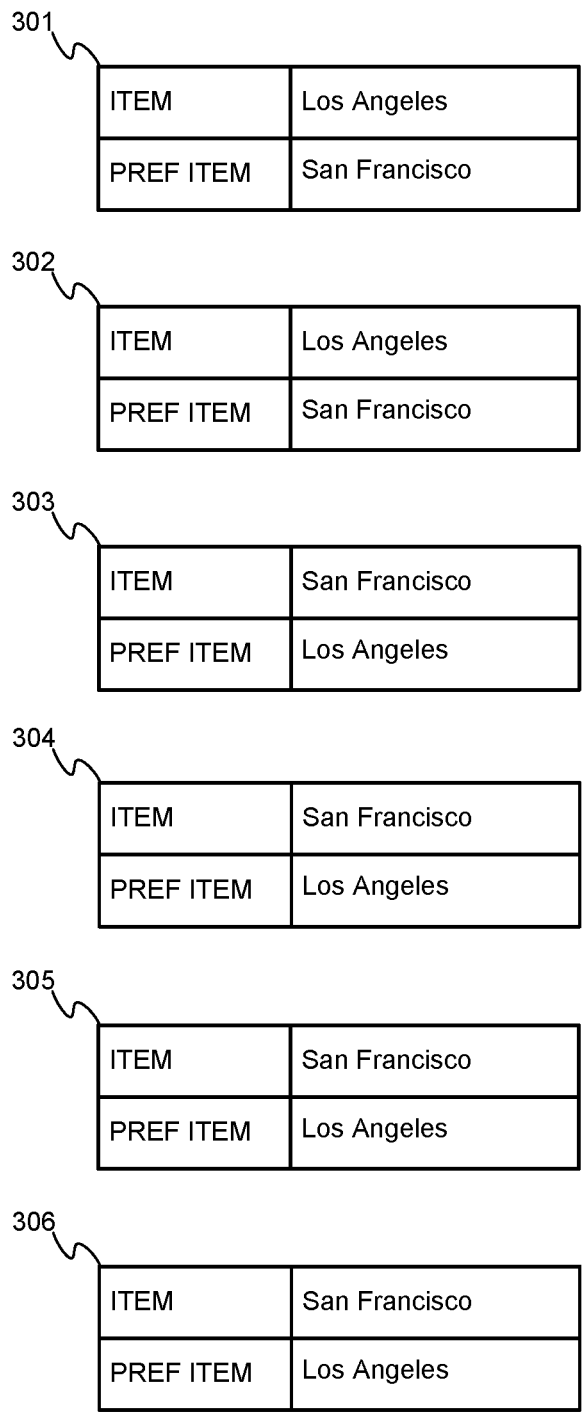

For each of snippets 201-210, FIGS. 3A-3B shows a corresponding Preference Frame instance 301-310. Each instance is produced from the focus sentence of its corresponding snippet, the focus sentence indicated in FIGS. 2A-2C by underlining.

The basic structure, of the FBSE described by Section 4, '837, is depicted in FIG. 11A, '837. This structure can be modified, as follows, in order to produce the frame instance data of FIGS. 3A-3B.
  1. Frame Extraction Rules 1103 can be rules designed to produce instances of the Preference Frame (i.e., each rule can be triggered upon detection of some kind of expression of a preference, for one item over another). FIG. 5A shows an example frame extraction rule 500 for producing instances of the Preference Frame. This rule (discussed further below) is in the pseudo-code format defined in Section 6.2, '837 ("Frame Extraction Rules").
  2. Source Corpus 1102 can be online opinion data, from any suitable source.

With these two changes, a "Frame-Based Database" (FBDB) based on the Preference Frame can be constructed, during pre-query processing, as described in Section 4.3.2 ("Pre-Query Processing"), '837. The FBDB can be referred to as FBDB(Preference Frame) where, in accordance with the terminology of Section 4.3.2.1 ("Overview"), '837, the Preference Frame is the "Organizing Frame" of the FBDB.

By searching the FBDB(Preference Frame) with an appropriate query or queries, a particular kind of preference can be studied. Searching the FBDB produces a Query-Selective Corpus, as is addressed by Section 4.3.3 ("Post- Query Processing"), '837. The Query-Selective Corpus is comprised of snippets, such as those depicted in FIGS. 2A-2C. An Instance Superset 1105 can then be produced from the Query-Selective Corpus, with a possible Instance Superset being, for FIGS. 2A-2C, the instances of FIGS. 3A-3B. For example, Query 1101, of FIG. 11A, '837, can consist of the names of the following four cities (sought for comparison) where matching on any one of the city names is sufficient: San Francisco or Los Angeles or New York or Las Vegas.

An example query screen, at which the city names can be entered by a user, is shown in FIG. 10A, the '294 Application. Specifically, FIG. 10A depicts a box 1001 at which the query can be entered.

The step "Instance Merging 1120" (described in Section 4.4, '837), and its production of a "Merged Superset 1106," is deleted from the process of FIG. 11A, '837. (While the Instance Merging step is not used, parts of the step are useful for generating an Instance Graph, as is discussed in below Section 2.2.)

The result of removing Instance Merging step 1120 is that once an Instance Superset 1105 has been produced, by Instance Generation 1110, it is directly subjected to Instance Selection 1130, in order to produce a Search Result 1104 (where Search Result 1104, of FIG. 11A, '837, corresponds to the frame instance data that is subjected to the graphical techniques of below Sections 2 and 3).

Application of Instance Selection step 1130, described in Section 4.5 ("Instance Selection"), '837, can be accomplished by a re-application of the query or queries that produced the Query-Selective Corpus, with such queries being applied in a more focused way to the contents of role values. After the application of Instance Selection, frame instance data, suitable for generating an Instance Graph and/or Plot, is available. For the example presented herein, of studying preferences between four US cities, Instance Superset 1105 is treated as being the same as Search Result 1104: both are depicted by the instances of FIGS. 3A-3B Especially for purposes of an SM_db, Section 1 ("Introduction") above presents an organization of an FBDB as a linear collection of internally hierarchical clusters. The example SM_db discussed above, has the following four levels:
1. DocumentObj or SnippetObj
    1.1. SentenceObj
        1.1.1. InstanceObj
            1.1.1.1. RoleObj It has been shown how the basic structure of the FBSE of the '837 Application can be modified, to the purpose of producing frame instance data. Also, the use of hierarchical clusters, to create a suitable FBDB in accordance with the '294 and the '417 Applications, has been presented. Given either of these frameworks, a more detailed discussion of rule 500 of FIG. 5A follows. Once again, as mentioned above, understanding the following discussion of rule 500 relies upon knowing the terminology of Section 6.2, '837 ("Frame Extraction Rules")

It can be seen that rule 500 has 4 lines, the first of which simply gives the rule a symbolic name, while each of lines 2-4 is a kind of sub-rule called a "Logical Form rule."

FIG. 5B shows an example input sentence 501 that is converted into a representation, called "Logical Form," shown in FIG. 5C. The Logical Form format is defined in Section 6.1, '837 ("Logical Form").

It is the Logical Form form of a sentence (such as Logical Form 502 of FIG. 5C) that is tested against a frame extraction rule (such as rule 500 of FIG. 5A) in order to produce an instance (such as instance 503 of FIG. 5D).

A line-by-line discussion, of lines 2-4 of frame extraction rule 500, follows.

Matching of the Logical Form 502, against the rule of FIG. 5A, begins by testing whether the Logical Form rule of line 2 is satisfied. Line 2 is satisfied if the root of a Logical Form matches the feature PREFER. PREFER is defined as follows:
  PREFER: a class of verbs expressing preference of one object over another, including the following set of verbs: {prefer|favor|want|pick|select|go_for |go_with |stick_with | . . . }

As can be seen, the verb of line 1 of Logical Form 502 (the verb "prefer") does match the Logical Form rule of line 2.

The Logical Form rule of line 3 is satisfied as long as there is any lexical unit in the role of Undergoer in Logical Form 502, and the lexical unit "BFTiE" satisfies this. This lexical unit is known to indicate the Preferred Item and is therefore assigned to the PREFERRED_ITEM_ROLE of Preferred Frame instance 503 of FIG. 5D.

The Logical Form rule of line 4 is satisfied as long as there is, in the Complement role of Logical Form 502, a preposition (that matches the feature OVER) with a Noun Phrase. OVER is defined as follows:
  OVER: a class of prepositions expressing a substitution of one item for another, including the following set of prepositions: {instead_of|way_over|over|than|rather_than|to|over|more_than}

As can be seen, the Complement of line 4 of Logical Form 502 (the phrase "way over TBE") does match the Logical Form rule of line 4. This Compliment is known to indicate the Item, against which the Preferred Item is compared, and therefore the Compliment is assigned to the ITEM_ROLE of Preferred Frame instance 503.

The description herein focuses on the graphing of frame instance data produced from a single frame (the Preference Frame 400) with two roles (Preferred Item 402 and Item 401). However, it can readily be appreciated, by one of ordinary skill in the art, that the techniques presented herein can be applied to frame instance data that has one or both of the following characteristics:
  produced from more than one frame
  produced from one or more frames, where at least one frame has more than two roles.

2.2 Instance Graph

A useful graphical representation, for understanding a collection of frame instance data, is a kind of directed graph referred-to herein as an "Instance Graph." As with directed graphs in general, an Instance Graph is comprised of nodes (or vertices) and directed edges. The particular type of directed graph addressed herein, however, has at least the following characteristics:
  1. Each node of the graph represents at least one role value of one instance. If two or more role values are the same or sufficiently similar, such that they are determined to represent a same item, the nodes corresponding to such role values are merged. Such merging can be accomplished with the Matching Role Values techniques of Section 4.4.3, '837.
  2. A single directed edge (referred to herein as a "simple edge") is added to represent one relationship, as established by an instance between its role values. However, if (as a result of node merging) two or more simple edges are between the same two nodes, the simple edges can be graphically represented by one "compound edge." A compound edge can appear the same as a simple edge, except it is graphically modified to be indicative of the number of simple edges it represents.

Figure 1B:
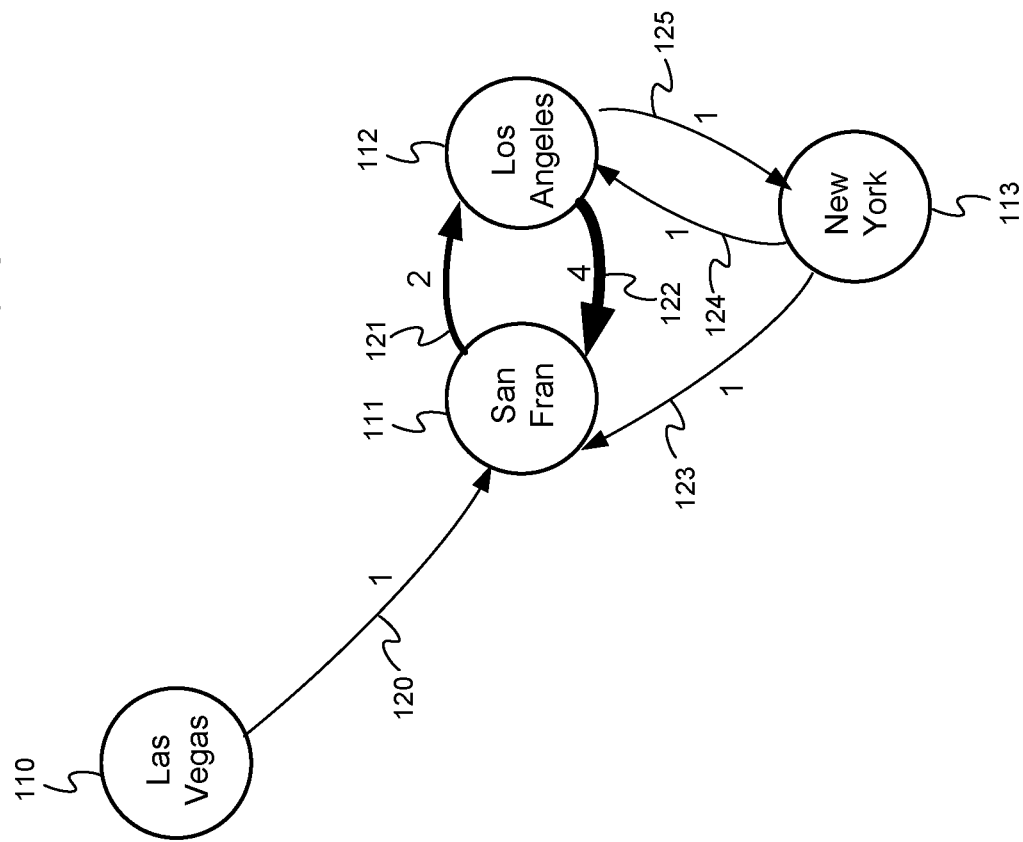
FIG. 1B is the same as FIG. 1A, except parts are labeled.

An example Instance Graph, for the instances of FIGS. 3A-3B, is shown in FIG. 1A. FIG. 1B is the same as FIG. 1A, except parts are labeled. FIG. 1B shows that each city is represented by a node 110-113. Preferences, between cities, are represented by directed edges 120-125. For each directed edge, the convention used is that the item at the edge's source is the value for the Preferred Item role (of a Preferred Frame instance), while the item at the target of the edge is the value for the Item role. (However, it can be readily appreciated that a reverse convention, where the edge's target is the Preferred Item and the edge's source is the Item, can be used.) As discussed in the above definition of an Instance Graph, an edge can represent more than one instance. The number of simple edges, represented by a compound edge, can be graphically indicated using any suitable technique, including one or both of the following:

Placing a number, indicative of the number of simple edges represented, in close proximity to the compound edge. For example, in FIG. 1B, 120 is a simple edge, 121 is compound (it represents the two relationships established by instances 301-302), and 122 is compound (it represents the four relationships established by instances 303-306).

Causing the thickness of an edge to be a function of (e.g., proportional to) the number of instances represented. For example, for FIG. 1B, the following edges have increasing thickness: 120, 121, and 122.

Figure 3C:
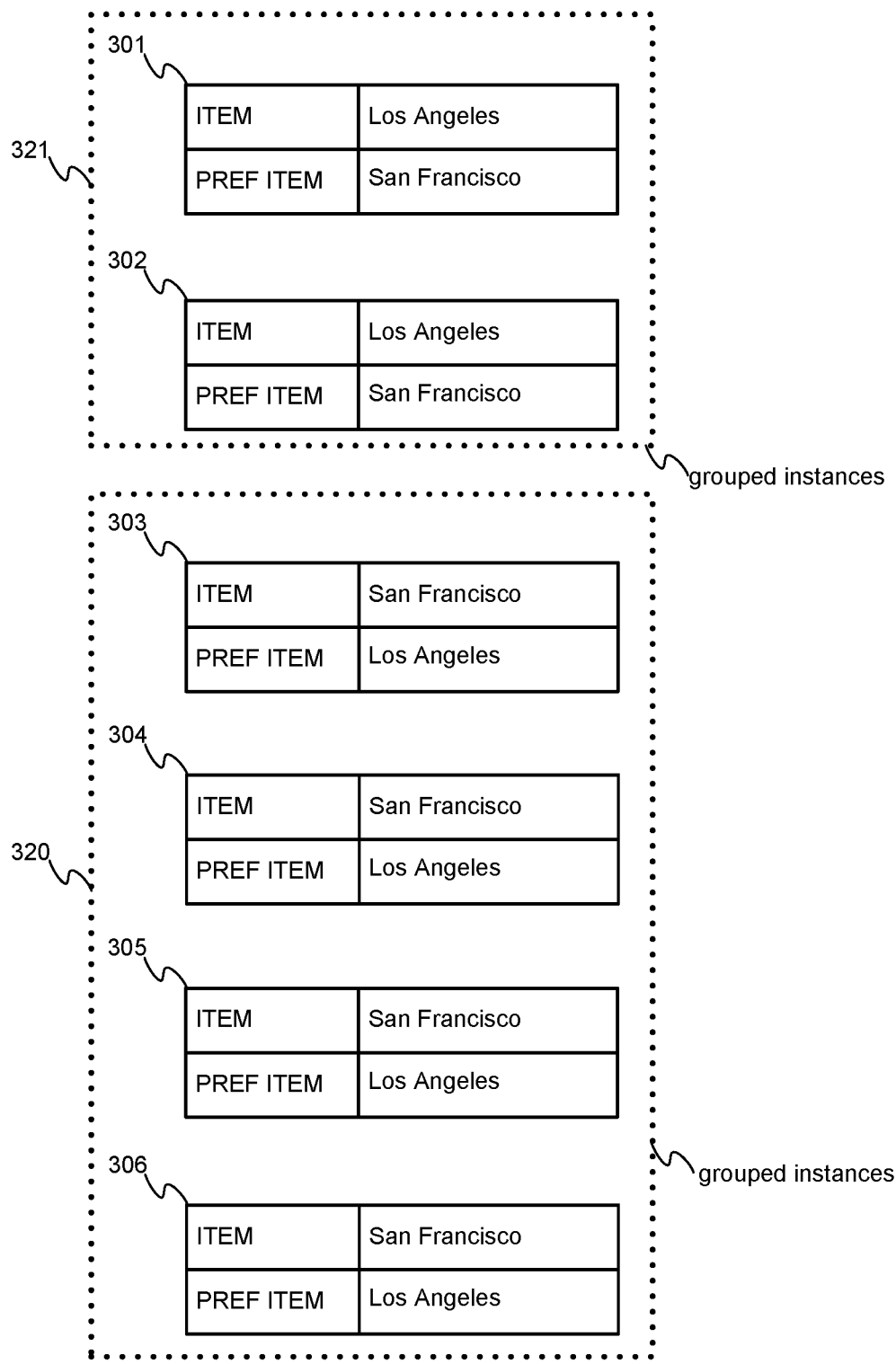
FIG. 3C is the same as FIG. 3B, except it introduces instance groups.

FIG. 3C is the same as FIG. 3A, except it introduces instance groups 321 and 320. Group 321 is represented by compound edge 121 and group 320 is represented by compound edge 122.

Automatic placement, of the nodes and edges of an Instance Graph, can be accomplished by the following procedure:

Model each node as producing a "field" (such as an electric field) that causes it to be repelled by all other nodes. For example, each node can be modeled as having a static electric "charge," of like polarity and amount.

For each pair of nodes ($N_x$, $N_y$), represent all simple edges of either direction, between them, by a set (called $All_{SE}$). Model an attractive force, between nodes ($N_x$, $N_y$), of a strength that is a function of (e.g., proportional to) the number of simple edges in $All_{SE}$. An example type of attractive force for modeling is the force profile of a mechanical spring.

The determination of an attractive force, between each pair of nodes of FIG. 1B, can be represented by the diagram of FIG. 1C. Each set of edges $All_{SE}$, between a pair of nodes of FIG. 1B, is represented by a single edge in FIG. 1C. For example, edge 120 of FIG. 1B is represented by edge 130 in FIG. 1C and edges 121-122 of FIG. 1B are represented by edge 131 in FIG. 1C. Each edge of FIG. 1C can be modeled as a spring, with an attractive force proportional to the number of instances it represents. For example, edge 131 can represent a spring that is 6× "stronger" than edge 130, since edge 130 represents 1 instance (the 1 instance of edge 120) while edge 131 represents 6 instances (the 2 instances of edge 121 plus the 4 instances of edge 122).

The placement of nodes and edges in FIG. 1B is a potential result of applying the above-described automatic placement procedure. The visualization of FIG. 1B, and the modeling of repulsive and attractive forces, can be accomplished with such data visualization toolkits as "flare." Flare is an ActionScript library for creating visualizations that run in the Adobe Flash Player. Flare is a creation of the Visualization Lab of the University of California at Berkeley.

For purposes of explaining further techniques to graphically present frame instance data, the following graph theory terminology is introduced:

Indegree: the total number of edges, coincident to a node, that are directed towards the node.

Outdegree: the total number of edges, coincident to a node, that are directed out from the node.

Degree: total number of edges, of either direction, coincident to a node.

The term "Degree" can also be described as "Influence," since it measures the number of times an item is the subject of an opinion, regardless of whether the role value is being mentioned positively (i.e., it is assigned to a Preferred Item role) or not (i.e., it is assigned to an Item role). The following Table I presents values, for each of these terms, for each node of FIG. 1B:

TABLE I

| Node | Outdegree | Indegree | Degree |
| --- | --- | --- | --- |
| San Francisco | 2 | 6 | 8 |
| Los Angeles | 5 | 3 | 8 |
| New York | 2 | 1 | 3 |
| Las Vegas | 1 | 0 | 1 |

Figure 1D:
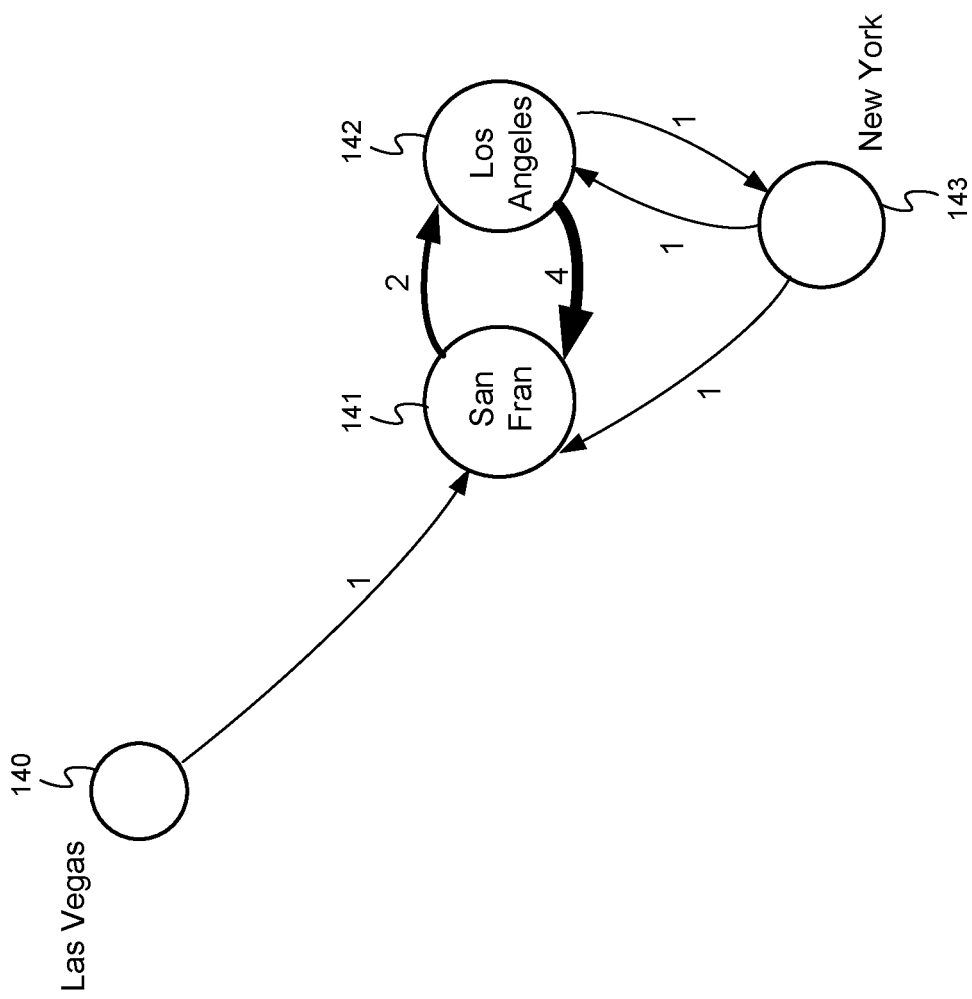
FIG. 1D is the same as FIG. 1B, except the diameter of a node is indicative of its degree.

When producing an Instance Graph, it can be useful to represent each node in a way that is visually indicative of its degree. For example, the diameter of a node can be a function of (e.g., proportional to) its degree. FIG. 1D is the same as FIG. 1B, except the diameter of a node is indicative of its degree. As can be seen, the nodes for San Francisco and Los Angeles (141 and 142) are largest, the node for New York (143) is next largest and the node for Las Vegas (140) is smallest.

Among other advantages, it is readily appreciated that an Instance Graph can provide at least the following features to enhance a user's ability to appreciate the centrality of certain items in shaping opinion:

Two or more items that have a large amount of "Influence" may tend to refer to each other, and will therefore tend to be placed in closer proximity to each other than less influential items. This is shown, for example, in FIG. 1B, where San Francisco and Los Angeles (nodes 111 and 112) are closer to each other than any other pair of nodes. Also, frequent reference, between a pair of nodes, can also be appreciated by the compound edges between them.

If an item "x" has a greater number of edges connected to it, relative to one or more other items, this can often be readily observed. Such observations can be further enhanced by the techniques described above, where the display of the node representing "x" can be made indicative, for example by its diameter, of its influence.

For a variety of reasons, it can be the case that a user wishes to produce an Instance Graph in an incremental manner. For example, a user may have a particularly strong interest in understanding preferences as they relate to a subset of the items that fit a particular category. Let us call this subset of items "subset 0." An initial Instance Graph display can include just the items of subset 0 and those items (called the "level 1 items") directly connected to them.

The incremental display process can then continue as follows:

1. User picks a subset of the level 1 items, called subset 1, for which their further connectivity is of interest. (Subset 1 can include all level 1 items.)
2. Items of a level 2 are identified (defined as those items directly connected to a subset 1 item and not already a member of level 1 or subset 0). 3. Items of level 2 are added to the Instance Graph display.

In general, an incremental display process can be described as follows:
1. User picks a subset of the level n items, called subset n, for which their further connectivity is of interest. (Subset n can include all level n items.)
2. Items of a level n+1 are identified (defined as those items directly connected to a subset n item and not already a member of level n, level n−1, . . . level 1 or subset 0).
3. Items of level n+1 are added to the Instance Graph display.

An example use of incremental Instance Graph generation is as follows: the manager or marketer for a brand "B" will often wish to understand competing brands in the context of how they relate to "B." For the example Instance Graph of FIG. 1B, assume a person is responsible for the marketing of New York City. In accordance with Section 1, an Instance Superset 1105 can be produced, by Instance Generation 1110, for all four cities of interest. Instance Selection 1130, however, can be accomplished with just "New York" as the query (i.e., "New York" node 113, of FIG. 1B, corresponds to "subset 0" in the above discussion of incremental Instance Graph production). The frame instance data produced identifies just San Francisco node 111 and Los Angeles node 112 as the "level 1" items. If San Francisco is selected as the item of subset 1, a re-application of Instance Selection 1130 will result in an identification of Las Vegas node 110 as the level 2 item.

2.3 Instance Plot

While the Instance Graph described in the previous section is comprised of nodes and edges, the Instance Plot of this section uses a coordinate system.

An Instance Plot is based on the three graph theory terms introduced in the last sub-section, plus the following:
Net Outdegree: the Outdegree of a node minus its Indegree.

"Net Outdegree" can also be described as "Net Preference," since it measures the extent to which an item, as represented by a node, appears as a Preferred Item more often than as an Item.

Table II (below) is the same as Table I of the previous section, except an additional "Net Preference" column is added (and "Degree" is renamed "Influence").

TABLE II

| Node | Outdegree | Indegree | Influence | Net Preference |
| --- | --- | --- | --- | --- |
| San Francisco | 2 | 6 | 8 | −4 |
| Los Angeles | 5 | 3 | 8 | +2 |
| New York | 2 | 1 | 3 | +1 |
| Las Vegas | 1 | 0 | 1 | +1 |

An example Instance Plot, using Table II, is shown in FIG. 1E. As can be seen, it is based on plotting an item (in this case, a USA city) according to its Net Preference and Influence values.

An Instance Plot can make clear that an Item with a great deal of Influence does not necessarily have the highest Net Preference. This is shown, for example, in FIG. 1E, where San Francisco and Los Angeles are both listed as having equal Influence. San Francisco, however, is shown as having a lower Net Preference than Los Angeles. Even for Los Angeles, it's Net Preference of +2 is not as high as one might expect, given how much greater it's Influence is, than that of New York or Las Vegas.

Thus, while an item that plots in the extreme upper-right corner of an Instance Plot is probably a "leader," in its category of items, an item could still be a category leader and plot in the extreme lower-right corner. An explanation for this result is as follows: because an item "L" is already recognized as its category's leader, customers/users of "L" know they are communicating little additional knowledge by expressing a positive opinion on "L." In contrast, customers/users know that comparisons with "L," of non-category leaders, can be very useful to others since "L" serves as a kind of common standard.

2.4 Additional Uses

While the Instance Graph and Plot have been described in relation to understanding preferences, in relation to online opinion data, it can be readily appreciated that they can be applied to any frame instance data where the frame establishes directional relationships.

For example, the '837 Application presents frames for Cause and Effect. Specifically, the '837 Application relates to the exploration of information about healthcare. The search system of the '837 Application permits the causes or effects, of a medical condition, to be found. Such causes or effects are, in themselves, medical conditions and can therefore be the subject of further cause or effect searching. While the '837 Application permits, in effect, search of a directed causality graph between medical conditions, it provides no techniques by which an actual directed graph can be realized and displayed to a user. Herein are presented some such display techniques.

3 Co-occurrence Graphs 3.1 Introduction

The previous section (Section 2 "Frame Instance Graphs") presents, mostly, a repetition of the graphical representations presented in the '713 Application.

The present section, however, introduces a new kind of graph, called a "Co-occurrence Graph." A Co-occurrence Graph can appear similar to an Instance Graph (i.e., Section 2.2 "Instance Graph"), and can be used for similar purposes. However, rather than showing relationships between "items" (where "item" is defined below in Section 4.1, "Item Definitions") as indicated by frame instances, the present section describes the generation of graphs that are primarily based upon co-occurrence.

The usage scenario, used herein for explaining Co-occurrence Graphs, is similar to the usage scenario presented above for Frame Instance Graphs: a person or organization seeking to better understand relationships (rather than preferences) between "items" of a certain category.

Co-occurrence has an advantage over frame instances in that co-occurrences are more easily found: two items need only occur within a certain distance of each other, but there need not be expressed any concepts linking the two. Thus, in general, co-occurrence has the advantage of providing greater "recall" capability, in comparison to a frame-based approach (conversely, a frame-based approach provides greater "precision" in its results).

In order to take advantage of the greater recall capability of co-occurrences, the search for co-occurrences needs to be applied to a Source Corpus that is not already limited by the fact of whether frame instances have been found. In relation to the database structures discussed above (Section 1, "Introduction"), this means that a document-based class structure may be advisable. In the following discussion, where the finding of co-occurrences is presented, the database searched is presumed to have a document-based class structure as described in Section 1. (However, it should be understood that any suitable database structure, that does not limit the source material searched to that which has already triggered frame extraction, can be used.)

Generally speaking, the term "co-occurrence" can be understood as follows. An item "x" and an item "y" co-occur if "x" and "y" both occur (or appear) within a same "unit of natural language" or UNL. Typically, co-occurrence is checked for within a Source Corpus that contains multiple UNL's. Any level of UNL can be used (e.g., sentence, paragraph, document) but, for a single Co-occurrence Graph, co-occurrences should be sought at a uniform level. The UNL focused upon herein is that of a single sentence (i.e., items "x" and "y" co-occur if they both occur within a same sentence). However, depending upon the application, any suitable UNL can be used.

For purposes of describing the Co-occurrence Graphs presented herein, however, it is helpful to have a more precise definition of co-occurrence.

Before more precisely defining "co-occurrence," however, it can be helpful to first define "occurrence." An occurrence, of an item "x," can be defined as follows:

x_identifier: any kind of identifier or pointer, that unambiguously indicates x (including all its constituent parts as defined below) and no other item.

x_symbols: a set of symbols or lexical units by which an occurrence of "x" can be identified x_matching: the set of techniques or algorithms by which a match of an element of x_symbols, and a portion of a Source Corpus of natural language, is determined. Finding these types of matches is essentially the same problem as finding matches between role values of frame instances (for purposes of "merging" role values), such as described in Section 4.4.3, '837 ("Matching Role Values"). Thus, the finding of a match, for purposes of identifying an occurrence, can be accomplished with essentially the same techniques.

Finding a "match," under these circumstances, is defined to be the finding of an "occurrence" of "x."

With regard to the above definitions, in order to discuss other example items, "x" is substitutable with any other appropriate sequence of 1 or more lexical units or symbols.

Further, for purposes of determining an occurrence, the Source Corpus is regarded as being divided according to the selected UNL (e.g., a sentence). For the case of SM_db defined above, the UNL, according to which occurrences are measured, can be the sentence. Occurrences of "x," in a Source Corpus, can be defined by a vector "x_vector." This vector has a corresponding value, for each UNL of the Source Corpus, indicative of whether x appears in that UNL. Each value of x_vector can be defined as follows:

1: if x appears 1 times in its corresponding UNL
0: x does not occur in its corresponding UNL More generally than x_vector, and without regard to any particular form of representation, x_oc can be used to represent the set of x occurrences. The total number of occurrences of x in the Source Corpus can be referred to herein as x_NO. If x_vector is defined as shown above, then x_NO can be determined by counting the number of 1's in x_vector.

Given the above definitions, finding co-occurrences of items "x" and "y" can be found as follows:

find a y_vector for "y," using the same techniques, described above, for finding x_vector determine the logical AND of x_vector and y_vector, and call the resulting vector xy_vector (equivalently, the resulting vector can be called yx_vector)

More generally than xy_vector, and without regard to any particular form of representation, xy_co can be used to represent the set of x and y co-occurrences (or, equivalently, the set of x and y co-occurrences can be called yx_co). The total number of co-occurrences of x and y in the Source Corpus, on a UNL by UNL basis, can be referred to herein as xy_NC (or, equivalently, the total number of co-occurrences can be called yx_NC). The value of xy_NC can be determined by counting the number of 1's in xy_vector.

3.2 Non-Directional Co-Occurrence Graph

Figure 7A:
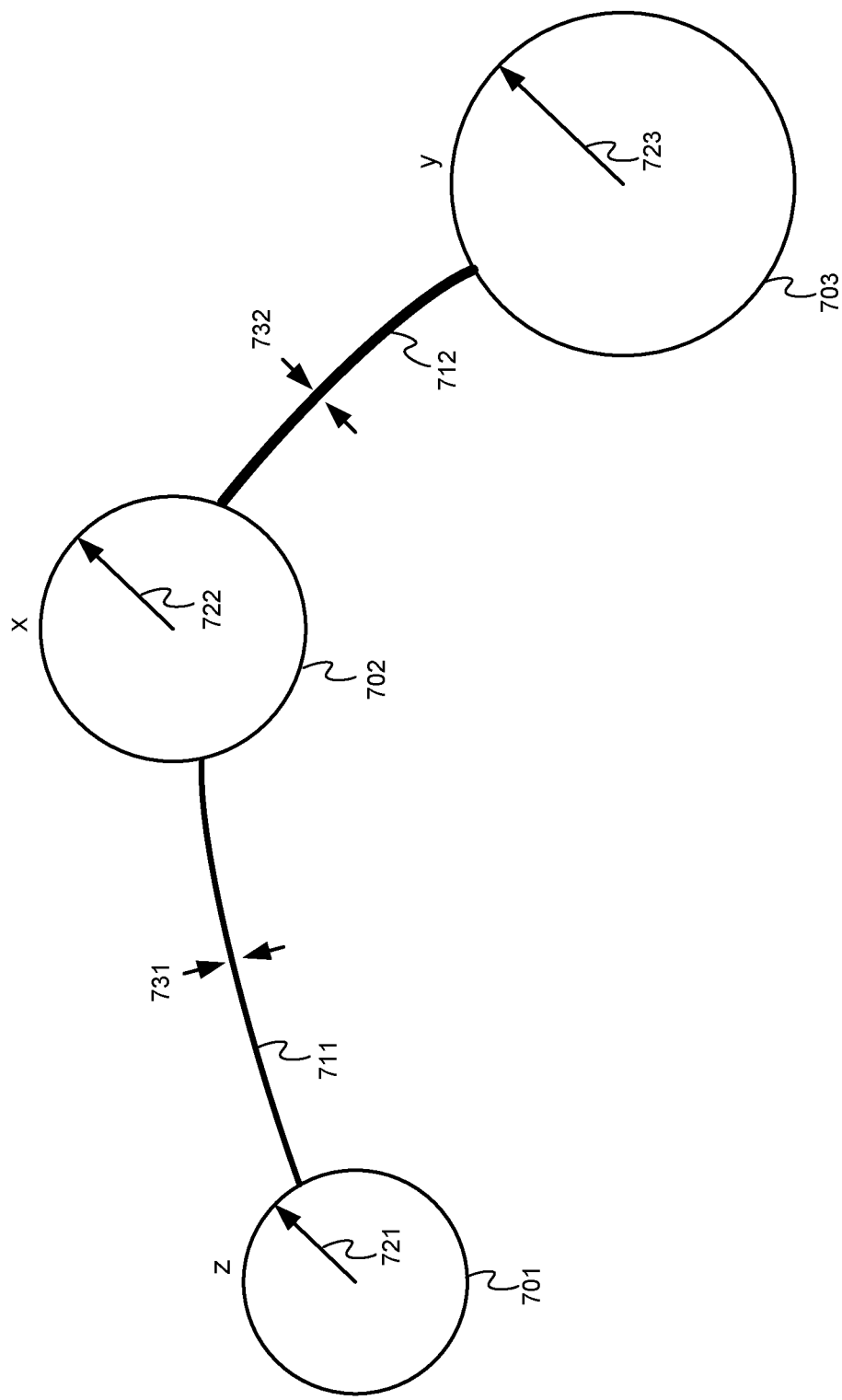
FIG. 7A shows a simple example Non-directional Co-occurrence Graph.

A simple example Non-directional Co-occurrence Graph is depicted in FIG. 7A.

In general, a Non-directional Co-occurrence Graph consists of nodes connected by nondirectional edges where:

Each node is representative of the occurrences of a particular item. FIG. 7A depicts three such nodes: 701 representing item "z", 702 representing item "x", and 703 representing item "y."

Each edge represents the co-occurrences of the two items it connects. FIG. 7A shows two such edges: 711 representing co-occurrences of items z and x, and 712 representing co-occurrences of items x and y.

In a similar manner to that discussed above (Section 2.1, "Introduction"), an example query screen, at which the item names to be graphed can be entered by a user, is shown in FIG. 10A of the '294 Application. Specifically, FIG. 10A depicts a box 1001 at which the query can be entered.

In terms of the terminology introduced above (Section 3.1, "Introduction"), for defining an occurrence, each of "x," "y," and "z" can be regarded as the "x_identifier" of an item. For example, assume that "x," "y," and "z" correspond to, respectively, the following items of FIG. 1A: "Los Angeles," "San Francisco," and "New York." In this case, for the item with x_identifier "Los Angeles," it's x_symbols can contain at least the following: "Los Angeles," "L. A.," "City of Angels." If any member of x_symbols matches in a Source Corpus, by using a matching technique of x_matching, then an occurrence of item "Los Angeles" can be regarded as having been found.

An example technique, by which a node can graphically represent the occurrences of its item, is as follows: its radius can be proportional, in accordance with any appropriate mathematical function, to the number of occurrences it represents. For example, for a node representative of an item x (as defined in Section 3.1, "Introduction"), such as node 702 of FIG. 7A, two example mathematical functions are:

log of x_NO (or Log(x_NO))
x_NO/c, where "c" is a scaling constant

For FIG. 7A, the three radii to be set are: 721, 722, and 723. In terms of relative size, the three radii are: 721<722<723. Thus, a user can determine graphically, that there are more occurrences of x than z, and that there are more occurrences of y than x.

Similarly, an edge can graphically represent its co-occurrences by having a thickness that is proportional, in accordance with any appropriate mathematical function, to the number of co-occurrences it represents. For an edge representative of the co-occurrences of items x and y (as defined in Section 3.1, "Introduction"), such as edge 712 of FIG. 7A, its thickness can be proportional xy_NC. Two example mathematical functions are:

log of xy_NC (or Log(xy_NC))
xy_NC/c, where "c" is a scaling constant

For FIG. 7A, the two thicknesses to be set are: 731, and 732. In terms of relative size, the thicknesses are: 731<732. Thus, a user can determine graphically, that there are more co-occurrences of x and y (xy_co), than there are co-occurrences of x and z (xz_co).

A placement of the nodes and edges of a Non-directional Co-occurrence Graph, that enhances user readability, can be achieved as follows:

Assigning a value of "negative" gravity to each node.

Causing each edge to simulate a spring, with the strength of the spring dependent upon the number of co-occurrences represented by the edge.

Other than the negative gravity and simulated springs, the Non-directional Co-occurrence Graph is not subject to any other forces.

The negative gravity creates a repulsive force between the nodes, causing them to attempt to fly apart from each other. The simulated springs, however, create a countervailing force that keeps the nodes within a finite distance of each other. If all nodes are given a uniform negative gravity, it can be seen that a pair of nodes connected by a stronger spring will reach an equilibrium distance shorter than that of a pair of nodes connected by a weaker spring. In this way, greater amounts of co-occurrence between items is represented by smaller distances between nodes.

Since xy_co>xz_co (or, stated equivalently, since xy_NC>xz_NC), it can be expected that edge 712 will be shorter than edge 711, and this is indicated in FIG. 7A. This provides the user with another way to determine, graphically, the relative frequencies of the co-occurrences.

3.3 Focusing on a Sub-Graph

Figure 7B:
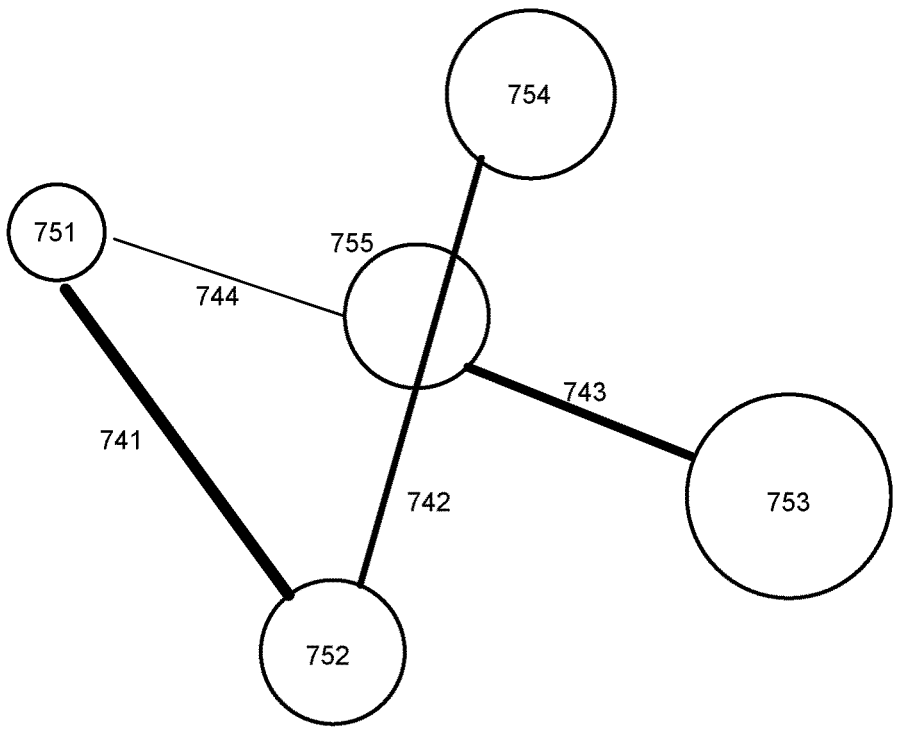
FIG. 7B shows a considerably more complex Non-directional Co-occurrence Graph than that of FIG. 7A.

FIG. 7B shows a considerably more complex Non-directional Co-occurrence Graph than that of FIG. 7A. FIG. 7B contains the following components:

Five nodes labeled: 751, 752, 753, 754, and 755.

Five edges labeled: 741, 742, 743, 744, and 745.

For more complex Co-occurrence Graphs, the following graphical technique can be useful for the analysis of such graphs. When a node "f1" is selected, because it is believed to be of particular interest as the focus of an analysis, only the following edges and nodes can be displayed:

The set of edges "e1" that are directly connected to f1.

The set of nodes "d1," other than f1, that are directly connected to edges e1.

In general, node f1 can be referred to as the "focus node," and f1 can be selected by any suitable technique (such as placing a mouse pointer over it and then issuing a "double-click" with the mouse). The sub-graph displayed, as a result of selecting a focus node, can be referred to as the "focus sub-graph."

Figure 7C:
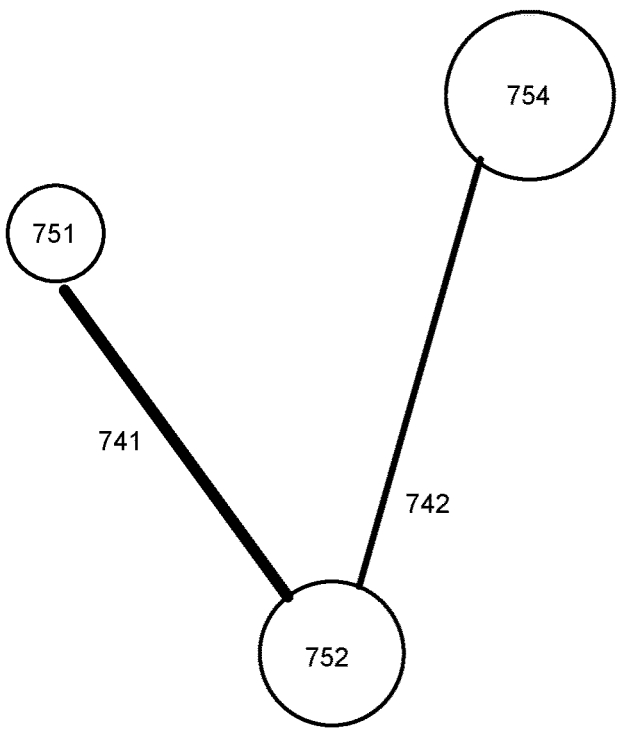
FIG. 7C depicts a focus sub-graph of FIG. 7B, found by selecting node 752 of FIG. 7B as the focus node.

If node 752 of FIG. 7B is selected as the focus node, FIG. 7C depicts the corresponding focus sub-graph. As can be readily appreciated, a user can find FIG. 7C easier to understand than FIG. 7B.

3.4 Dynamic Characteristics

In addition to graphically visualizing co-occurrence with static graphical characteristics, such as edge thickness and/or equilibrium spring length, dynamic graphical properties can also be useful. For example, in addition to assigning each node a simulated physical characteristic of "gravity" (in this case, of course, "negative" gravity), each node can be assigned a "mass." With mass introduced, it will take a certain amount of time, that can be long enough to be visually discernible by the user, for an equilibrium spring length to be reached. In this case, a user can "grab" a node of interest (e.g., a focus node), "drag" the node of interest, and observe the speed with which connected nodes reach an equilibrium with respect to the node of interest.

Figure 7D:
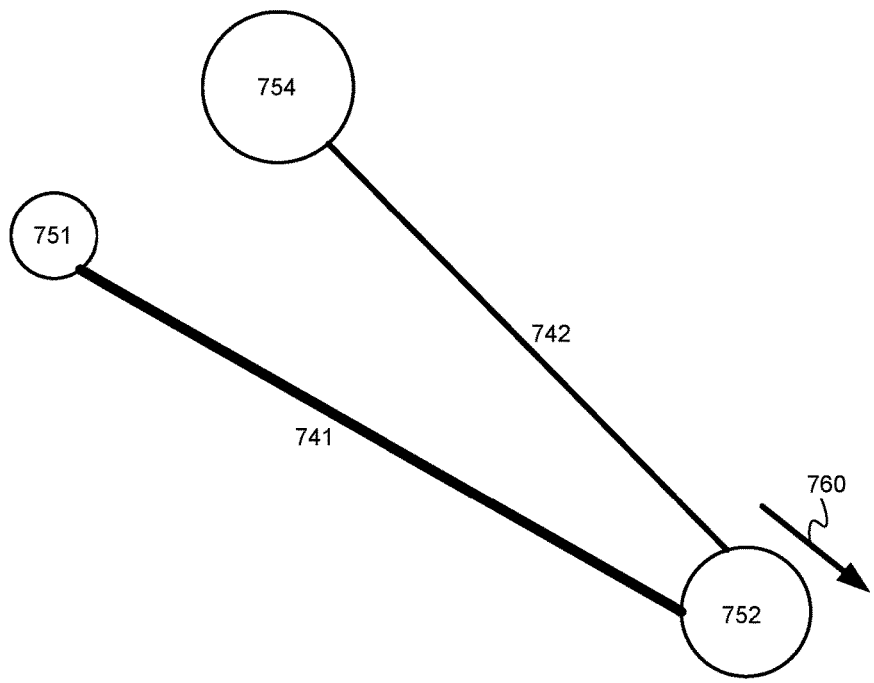
FIG. 7D, shows a way in which the time to reach equilibrium can be made visible to a user, by the user grabbing and dragging a node.

FIG. 7D, for example, repeats the focus sub-graph of FIG. 7C, but shows node 752 as having been "grabed" by a user and "dragged" in the direction of arrow 760. In this case, assuming, for example, equal mass having been assigned to each of nodes 751 and 754, it will take node 754, with its "weaker" spring connection to node 752, a longer time to "catch up" to node 752 than the time it will take node 751 to catch-up with node 752. This difference in time periods can be made long enough to be observable by the user and therefore provide a dynamic indication of differences in the number of co-occurrences.

Figure 7E:
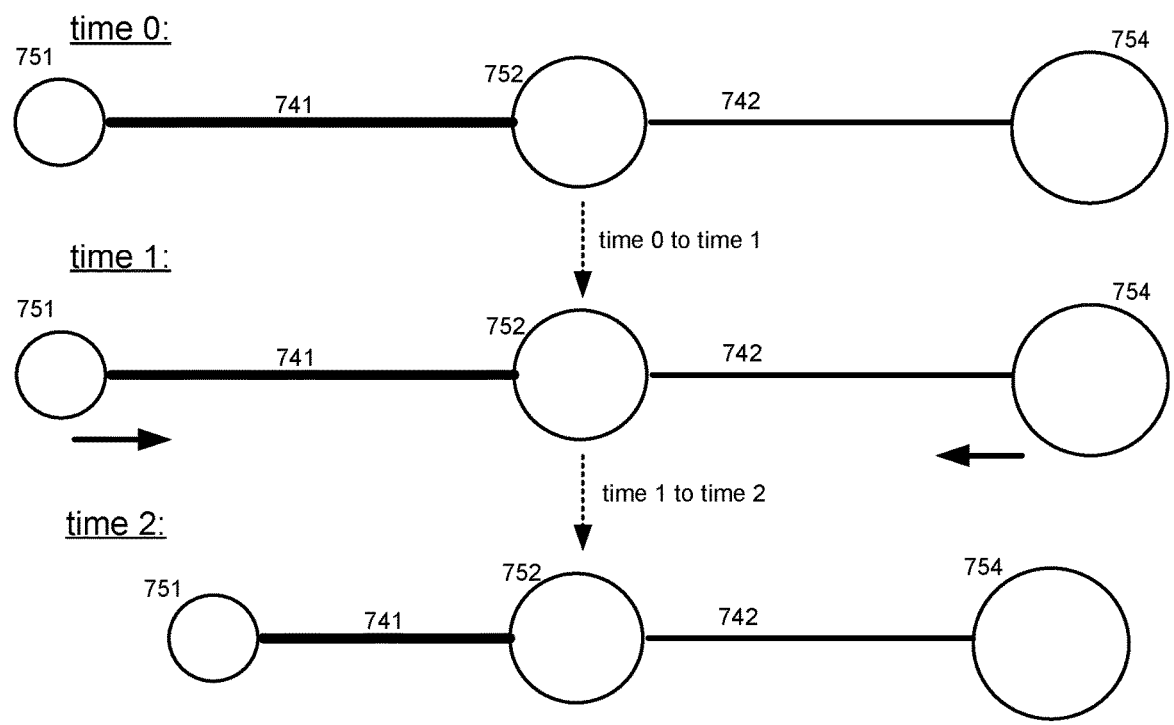
FIG. 7E shows a sequence of steps, by which the time to reach equilibrium can be made visible to a user.

FIG. 7E shows another way in which the time to reach equilibrium can be made visible to a user. FIG. 7E repeats, at three different times, the focus sub-graph of FIG. 7C:

1. time 0: Upon selecting the focus sub-graph, just the focus sub-graph is shown to the user with particular initial conditions. The focus node is shown as surrounded by the nodes of d1, with the nodes of d1 all held at an equal distance from the focus node.
2. time 1: The nodes of d1 are "released" and they begin to move towards the focus node. At this point, the user can observe the relative speeds with which the nodes of d1 approach the focus node. The speed differences allow the user to observe, for each node of d1, the number of co-occurrences it has, relative to the other nodes of d1. During the period of "time 1," it can be useful to keep the focus node immobile, so that only the nodes of d1 can move towards the focus node (and, conversely, the focus node cannot move towards the nodes of d1).
3. time 2: By this time, the focus sub-graph has reached its equilibrium. Because the spring represented by edge 741 is stronger than the spring represented by edge 742, at equilibrium, edge 741 is shorter than edge 742.

3.5 Directional Co-Occurrence Graph

Figure 8A:
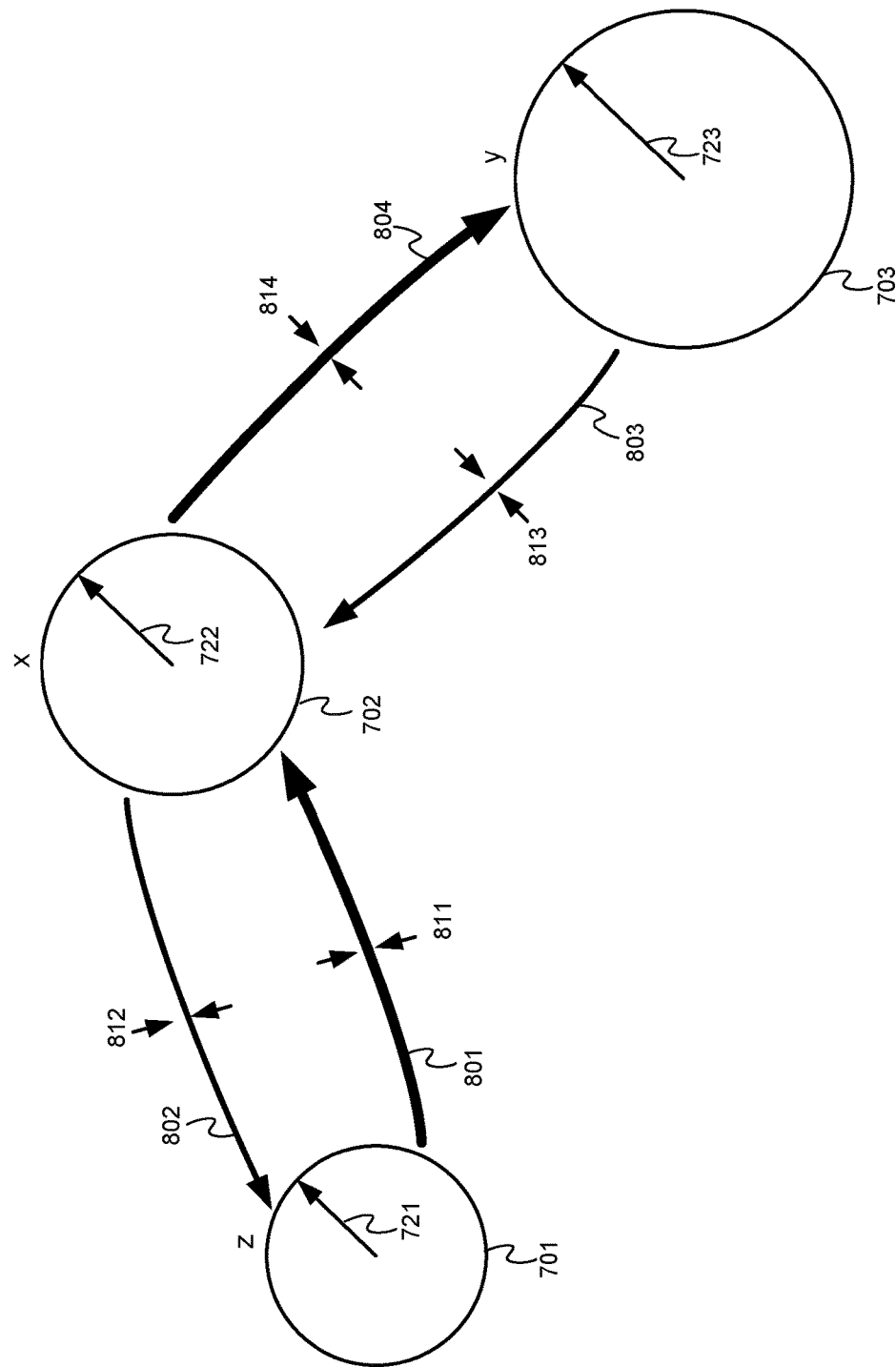
FIG. 8A depicts a simple example Directional Co-occurrence Graph.

A simple example Directional Co-occurrence Graph is depicted in FIG. 8A. Like FIG. 7A, FIG. 8A has a same three nodes: 701 representing item "z", 702 representing item "x", and 703 representing item "y." However, between nodes 701 and 702 are directed edges 801 and 802. Similarly, between nodes 702 and 703 are directed edges 803 and 804.

In general, a Directional Co-occurrence Graph is the same as a Non-directional Co-occurrence Graph, except, rather than only having the possibility of a single non-directed edge between each pair of nodes, there can be up to two directed edges. For a pair of items x and y, these two edges can be defined as follows:

edge pointing from x to y (represented symbolically as x_to_y): can be used to represent the occurrences of x (symbolically, x_oc) relative to the co-occurrences of x and y (symbolically, xy_co). For example, the thickness of x_to_y can be a function of the number of elements of x_oc (i.e., x_NO) and the number of elements of xy_co (i.e., xy_NC). More specifically, the thickness can be proportional to:

$$\frac{xy\_NC}{x\_NO}$$

edge pointing from y to x (represented symbolically as y_to_x): can be used to represent the occurrences of y (symbolically, y_oc) relative to the co-occurrences of x and y (symbolically, xy_co). For example, the thickness of y_to_x can be a function of the number of elements of y_oc (i.e., y_NO) and the number of elements of xy_co (i.e., xy_NC). More specifically, the thickness can be proportional to:

$$\frac{xy\_NC}{y\_NO}$$

(As appropriate to the particular use, the two above-given assignments, of an edge direction to its representing a selection of a set of occurrences and co-occurrences, can be reversed.)

For the edges of FIG. 8A, it will be assumed that the thickness of each depends upon the following function:

Thickness 811 of edge 801: $\frac{zx\_NC}{z\_NO}$

Thickness 812 of edge 802: $\frac{zx\_NC}{x\_NO}$

Thickness 813 of edge 803: $\frac{xy\_NC}{y\_NO}$

Thickness 814 of edge 804: $\frac{xy\_NC}{x\_NO}$

In order to enhance user readability, the same techniques described above, for a Non-directional Co-occurrence Graph, can be used. Specifically:

Assigning a value of "negative" gravity to each node.

Causing each edge to simulate a spring, with the strength of the spring dependent upon the thickness of its edge.

Other than the negative gravity and simulated springs, the Non-directional Co-occurrence Graph is not subject to any other forces.

Because of the use of relative metrics, there are some important differences between FIG. 7A and FIG. 8A. For example, it will be assumed that all the occurrence and co-occurrence values, for x, y, and z, are all the same. Despite this, in FIG. 8A, the distance between nodes 701 and 702 is approximately equal to the distance between nodes 702 and 703. In contrast, in FIG. 7A (as discussed above), the distance between nodes 702 and 703 is shorter than the distance between nodes 701 and 702. The reason for this difference can be as follows:

Edges 802 and 804 are most similar to, respectively, edges 711 and 712 of FIG. 7A. This is because edges 802 and 804 are both compared to a same value (x_NO) when determining edge thickness. Thus, edge 804 is thicker than edge 802, in a similar way to edge 712 being thicker than edge 711.

With regard to edges 801 and 803, however, the fact that xy_NC is greater than xz_NC is offset by y_NO being greater than z_NO. This is why the edge from y to x (numbered 803 in FIG. 8A and represented, symbolically, as y_to_x) is shown as being thinner than the edge from z to x (numbered 801 in FIG. 8A and represented, symbolically, as z_to_x).

It is assumed that the sum of thicknesses 813 and 814 is, therefore, approximately equal to the sum of thicknesses 811 and 812. This causes the net "spring" strength between nodes 701 and 702 (in FIG. 8A) to be approximately equal to the net "spring" strength between nodes 702 and 703 (also considered with respect to FIG. 8A).

3.6 Viewing Considerations

The above-described techniques for Non-directional Co-occurrence Graphs, for focusing on the sub-graph (Section 3.3, "Focusing on a Sub-Graph") and using dynamic characteristics (Section 3.4 "Dynamic Characteristics"), can be applied in essentially the same way to Directional Co-occurrence Graphs. The only differences are as follows:

Rather than having a single non-directional edge, between each pair of nodes, there can be up to two directional edges.

The spring strength, effecting dynamic behavior, can be a net strength from a pair of directional edges.

3.7 Adding Other Data

Although the Non-directional and Directional Co-occurrence Graphs are both primarily based upon occurrence and/or co-occurrence data, it can be useful to add other kinds of data to them. For example, any combination of the following kinds of information can be added:

frame instance data

Instance Graphs can be overlaid document demographic data, such as gender of author, or age of author 3.7.1 Frame Instance Data Both the '294 and '417 Applications present examples, respectively, in Section 2.1 ("Consumer Sentiment Search") and Section 1.2 ("Consumer Sentiment Search"), of a sentiment search. This is a search of a "Corpus of Interest" (C_of_I) for an "Object of Interest" (O_of_I) in order to determine sentiment towards the O_of_I. The '417 Application presents a sentiment search (section 1.3, "Sentiment Analysis"), in which a "net" sentiment value is determined.

A sentiment search, as described in the '294 and '417 Applications, relies upon finding instances of a frame. While many types of frames can form the basis of a sentiment search, they can be summarized as providing (in a direct or equivalent form) at least the following roles:

Object_Role: an O_of_I towards which "sentiment" is expressed.

Sentiment_Role: A particular sentiment (or emotion), if any, expressed towards the O_of_I, as indicated by the value of the Object_Role.

More particularly, the '294 and '417 Applications describe a consumer sentiment search, in which consumer sentiment is determined towards an O_of_I that is a brand of consumer product. A type of C_of_I that can be searched is a database of social media postings, also referred to as an SM_db.

With regard to a Directional Co-occurrence Graph or a Non-directional Co-occurrence Graph, it can be useful to find a net sentiment value of one or more of the items being graphed. Net sentiment for an item x can be found under two main circumstances:

1. Circumstance 1: for all occurrences of x (e.g., for x, when x is represented by a node)

2. Circumstance 2: for those occurrences of x where an item y has co-occurred (e.g., for x, when x is represented, along with a co-occurring y, by an edge)

Assuming Circumstance 1, and the document-based class structure of Section 1, the following steps can be performed, to find the net sentiment of an item x:

1. Through appropriate queries of the index "Sentence" for SentenceObj, all sentences in the Source Corpus, that contain an occurrence of x, can be found. Every such sentence can be found, regardless of whether it has produced a frame instance, because all sentences of the Source Corpus are indexed. In accordance with the terminology introduced above, in Section 3.1 ("Introduction"), the sentences found can be represented by a vector called "vector_x_sentence." The vector_x_sentence contains a "1" for each SentenceObj that contains an occurrence of x (and contains a "0" for all other SentenceObj's).
2. Through use of the "To" operator (see, for example, Section 1.1, "First Embodiment," the '294 Application), every sentiment-indicative frame instance, for every sentence of vector_x_sentence, can be found.
3. Through appropriate queries, find those instances that express a sentiment about x and, depending upon the value of the sentiment, increment an appropriate counter.

Assuming Circumstance 2, and the document-based class structure of Section 1, the following steps can be performed, to find the net sentiment of an item x when it co-occurs with an item y:
1. Through appropriate queries of the index "Sentence" for SentenceObj, all sentences in the Source Corpus, that contain an occurrence of x and y, can be found. Every such sentence can be found, regardless of whether it has produced a frame instance, because all sentences of the Source Corpus are indexed. In accordance with the terminology introduced above, in Section 3.1 ("Introduction"), the sentences found can be represented by a vector called "vector_xy_sentence." The vector_xy_sentence contains a "1" for each SentenceObj that contains an occurrence of x and y (and contains a "0" for all other SentenceObj's).
2. Through use of the "To" operator (see, for example, Section 1.1, "First Embodiment," the '294 Application), every sentiment-indicative frame instance, for every sentence of vector_xy_sentence, can be found.
3. Through appropriate queries, find those instances that express a sentiment about x and, depending upon the value of the sentiment, increment an appropriate counter.

Section 1.3 of the '417 Application ("Sentiment Analysis"), presents a sentiment analysis in which a net sentiment value is determined. The example of the '417 Application is to determine net sentiment of consumers towards a consumer product brand. The '417 Application categorizes sentiment into two types:
polarity (i.e., whether the sentiment is generally positive or negative) and
intensity (i.e., whether the sentiment is generally strong or weak).

If the sentiment analysis is to determine polarity of sentiment, then, with respect to the steps outlined above, for either of Circumstance 1 or 2, step 3 increments one of two counters:
Np=keeps track, from the total number of instances with a sentiment about x, the number of instances expressing positive sentiment about x, and
Nn=keeps track, from the total number of instances with a sentiment about x, the number of instances expressing negative sentiment about x.

The '417 Application shows how Np and Nn can be used as input to a function that produces the following range of values:
+1.00: when Np+Nn=Np (meaning all instances have been categorized as positive)
0.00: when Nn=Np (meaning an equal number of instances have been categorized as positive or negative)
−1.00: when Np+Nn=Nn (meaning all instances have been categorized as negative)

The '417 Application presents the following as a suitable function for production of the above-listed range of values. This function produces what is called a "Net Polarity Metric" (or NPM):

$$\frac{Np - Nn}{Np + Nn}$$

Then, on the scale of −1.00 to +1.00, assign three ranges of values:
a range of values that is classified as positive sentiment
a range of values classified as neutral sentiment
a range of values that is classified as negative sentiment For each of the three ranges, an appropriate graphical representation can be selected. For example, each range can be represented by a different color. Another possibility, is to assign a different graphical pattern to each range. An example set of ranges, along with example graphical representations for each range, are as follows:
0.30≤NPM≤1.00: Any value in this range can be defined as representative of a net sentiment that is positive. A node or edge, representative of this range, can be assigned the color green, or can be drawn with a line comprised of plus-signs (i.e., "+").
0.30≥NPM>−0.30: Any value in this range can be defined as representative of a net sentiment that is neutral (i.e., neither positive nor negative). A node or edge, representative of this range, can be assigned the color yellow, or can be drawn with an ordinary continuous line.
−0.30≥NPM≥−1.00: Any value in this range can be defined as representative of a net sentiment that is negative. A node or edge, representative of this range, can be assigned the color red, or can be drawn with a line comprised of minus-signs (i.e., "−").

Figure 8B:
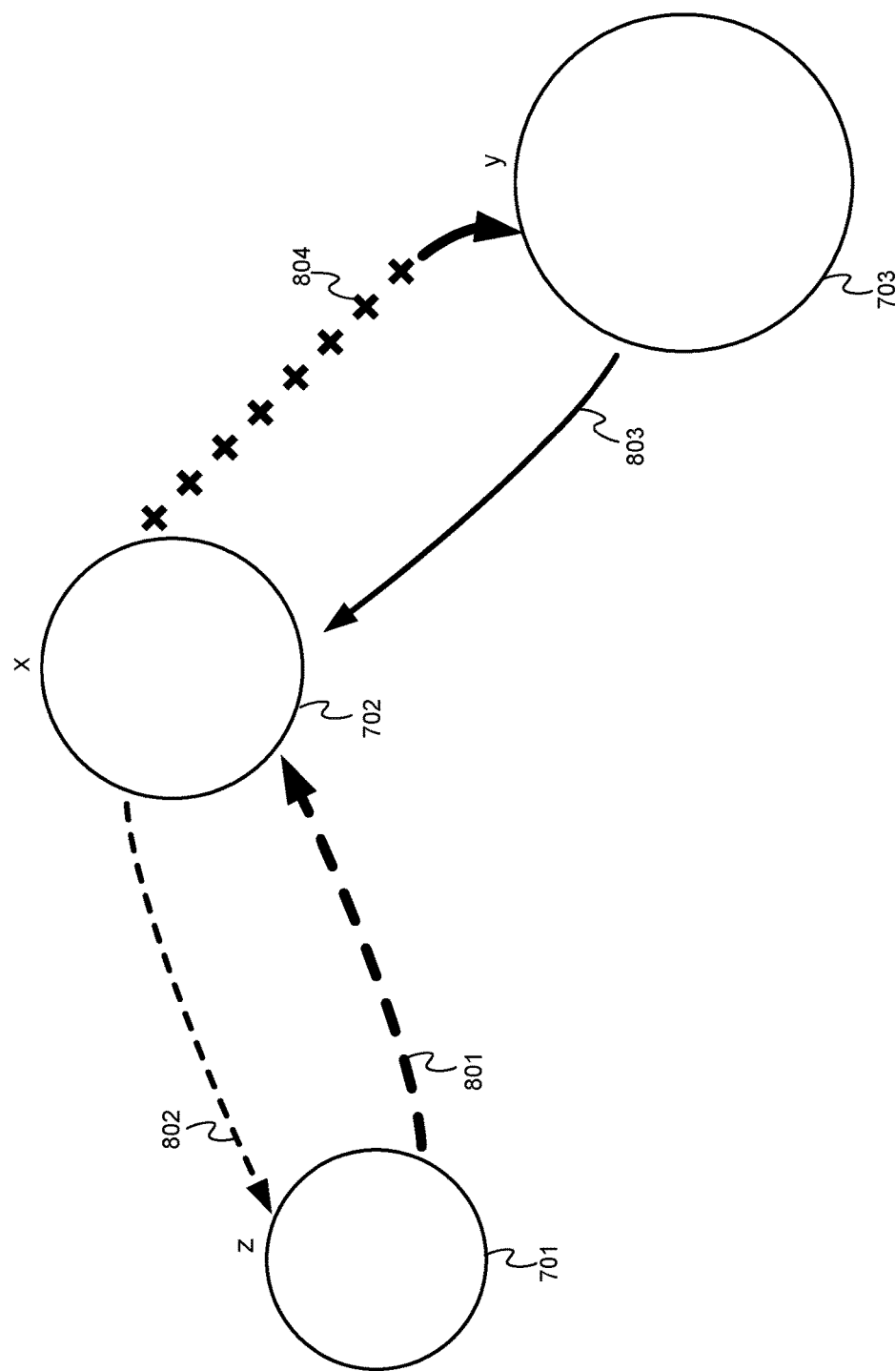
FIG. 8B is the same as FIG. 8A, except net sentiment values are represented by drawing certain edges with certain graphical patterns.

FIG. 8B is the same as FIG. 8A, except net sentiment values have been added, in accordance with the above described graphical patterns. In particular, each edge of FIG. 8A can be described as follows:
Edge 802: represents, with minus signs, that item x tends to be discussed negatively, when it is discussed in proximity to item z.
Edge 804: represents, with plus signs, that item x tends to be discussed positively, when it is discussed in proximity to item y.
Edge 801: represents, with minus signs, that item z tends to be discussed negatively, when it is discussed in proximity to item x.
Edge 803: represents, by being drawn with an ordinary continuous line, that item y tends to be discussed in a neutral fashion, when it is discussed in proximity to item x.

While frames encoding sentiment information have been focused upon in this sub-section, any other appropriate information, extractable as frame instances, can be used.

3.7.2 Document Demographics

With regard to a Directional Co-occurrence Graph or a Non-directional Co-occurrence Graph, it can be useful to extract, with respect to one or more of the items being graphed, demographic information regarding the source documents forming the basis for the graphs.

Among the Related Applications, the '848 Application addresses, in greatest detail, the determination of a demographic. The '848 Application defines a demographic as "any characteristic that can be meaningfully summarized with respect to a population" (also see below Glossary of Selected Terms).

The demographic focused-upon in this sub-section is gender, but the techniques presented can be applied to any other demographic, such as age or affluence.

Demographic information, regarding source documents, can be found under two main circumstances:
1. Circumstance 1: For all documents that form the basis for finding all occurrences of an item x. In this circumstance, the occurrences of item x are represented by a node, in either type of Co-occurrence Graph.
2. Circumstance 2: For those documents that form the basis for finding co-occurrences of x and y. In this circumstance, the co-occurrences of x and y are represented by an edge, in either type of Co-occurrence Graph.

Assuming Circumstance 1, and the document-based class structure of Section 1, the following steps can be performed, to find the demographics for the documents that form the basis for finding all occurrences of an item x:
1. Through appropriate queries of the index "Sentence" for SentenceObj, all sentences in the Source Corpus, that contain an occurrence of x, can be found. Every such sentence can be found, regardless of whether it has produced a frame instance, because all sentences of the Source Corpus are indexed. In accordance with the terminology introduced above, in Section 3.1 ("Introduction"), the sentences found can be represented by a vector called "vector_x_sentence." The vector_x_sentence contains a "1" for each SentenceObj that contains an occurrence of x (and contains a "0" for all other SentenceObj's).
2. Through use of the "To" operator (see, for example, Section 1.1, "First Embodiment," the '294 Application), every document, that contains the sentences of vector_x_sentence, can be found.
3. Through appropriate queries, analyze the documents found, according to the particular demographic of interest. For example, if the demographic is gender, two counts can be kept:
   a. Nm=number of documents where the author's gender is male
   b. Nf=number of documents where the author's gender is female
4. Represent the demographic values found, using any appropriate graphical representation, on the node representing x. In the case of gender, in essentially the same way described above (Section 3.7.1, "Frame Instance Data") by which a Net Polarity Metric is determined, a Net Gender Metric is determined, divided into ranges, and graphically represented on the appropriate node. For example, a node can be colored blue, if the authors of the documents, upon which it is based, tend to be male. If the authors tend to be female, the node can be colored pink.

Assuming Circumstance 2, and the document-based class structure of Section 1, the following steps can be performed, to find the demographics for the documents that form the basis for finding all co-occurrences of items x and y:
1. Through appropriate queries of the index "Sentence" for SentenceObj, all sentences in the Source Corpus, that contain a co-occurrence of x and y, can be found. Every such sentence can be found, regardless of whether it has produced a frame instance, because all sentences of the Source Corpus are indexed. In accordance with the terminology introduced above, in Section 3.1 ("Introduction"), the sentences found can be represented by a vector called "vector_xy_sentence." The vector_xy_sentence contains a "1" for each SentenceObj that contains a co-occurrence of x and y (and contains a "0" for all other SentenceObj's).
2. Through use of the "To" operator (see, for example, Section 1.1, "First Embodiment," the '294 Application), every document, that contains the sentences of vector_xy_sentence, can be found.
3. Through appropriate queries, analyze the documents found, according to the particular demographic of interest. For example, if the demographic is gender, two counts can be kept:
   a. Nm=number of documents where the author's gender is male
   b. Nf=number of documents where the author's gender is female
4. Represent the demographic values found, using any appropriate graphical representation, on the edge representing the x and y co-occurrences. In the case of gender, in essentially the same way described above (Section 3.7.1, "Frame Instance Data") by which a Net Polarity Metric is determined, a Net Gender Metric is determined, divided into ranges, and graphically represented on the appropriate edge. For example, an edge can be colored blue, if the authors of the documents, upon which it is based, tend to be male. If the authors tend to be female, the edge can be colored pink.

3.7.3 Instance Graphs

In some situations, can be useful to have an Instance Graph overlaid, on top of either of a Non-directional Co-occurrence Graph or a Directional Co-occurrence Graph. This can be accomplished by finding, between the two types of graphs, each pair of nodes that represent a same corresponding item.

4 Additional Information 4.1 Item Definitions

As discussed above, with respect to Frame Instance and Co-occurrence Graphs, the term "item" is understood very broadly and, therefore, almost anything can be the subject of such graphs.

For example, "item" is understood to include anything that can be referenced by a noun. Examples of such kinds of nouns, in no way intended to be limiting, include:
the name of a particular product or service
a brand of product (e.g., a consumer product brand)
a product category (e.g., smart phones, chocolates, soda drinks)
a color
a holiday
a famous person
a company name Using the above-listed nouns, following are some of the kinds of questions that could be answered, with Instance and/or Cooccurrence Graphs:
What are the relationships between a group of movie stars?
What are the relationships between a group of movie stars and the companies they work for?
What colors are associated with a particular holiday?
When a new kind of product is introduced, but product categories do users associate it with? For example, when the IPHONE (from APPLE Inc., Cupertino, Calif., USA) was first introduced, did its users think of it as a phone, a music player, and/or a camera?

Some other definitions for, for the kinds of things or entities the term "item" can refer to, include the following:
any lexical unit
any catchphrase
a "hash tag" or any other kind of symbol Regarding the above listed definitions of this Section 4.1, any combination of them can be used.

4.2 Computing Environment

FIG. 6 depicts an example production-level computer system design in which the techniques described herein can be applied.

Cloud 630 represents data, such as online opinion data, available via the Internet. Computer 610 can execute a web crawling program, such as Heritrix, that finds appropriate web pages and collects them in an input database 600. An alternative, or additional, route for collecting input database 600 is to use user-supplied data 631. For example, such user-supplied data 631 can include the following: any non-volatile media (e.g., a hard drive, CD-ROM or DVD), record-oriented databases (relational or otherwise), an Intranet or a document repository. A computer 611 can be used to process (e.g., reformat) such user-supplied data 631 for input database 600.

Computer 612 can perform the indexing needed for formation of an appropriate FBDB. The indexing phase scans the input database for sentences that refer to an organizing frame, produces a snippet around each such sentence and adds the snippet to the appropriate frame-based database. FIG. 6 depicts an example frame-based database 601. For the example frame instance system as described in Section 2 ("Frame Instance Graphs"), an FBDB based on the Preference Frame could be produced. For the co-occurrence system of Section 3 ("Co-occurrence Graphs"), an FBDB can be used that is based on a document-based class structure.

Databases 620 and 621 represent, respectively, stable "snapshots" of databases 600 and 601. Databases 620 and 621 can provide stable databases that are available to service requests to produce graphical representations (i.e., Instance Plots, Instance Graphs, and/or Co-occurrence Graphs), in response to requests entered by a user at computer 633. Such user requests can travel over the Internet (indicated by cloud 632) to a web interfacing computer 614 that can also run a firewall program. Computer 613 can receive the user query, produce frame instance and/or co-occurrence data from the contents of the appropriate FBDB (e.g., FBDB 621), produce a graphical representation of the frame instance and/or co-occurrence data, and transmit the graphical representation back to computer 633 for display to the user. The results from computer 613 can also be stored in a database 602 that is private to the individual user. When it is desired to see the snippets and/or documents, on which a graphical representation is based, FBDB 621 is available. If it is further desired to see the full documents, on which snippets and/or documents of an FBDB are based, input database 620 is also available to the user.

In accordance with what is ordinarily known by those in the art, computers 610, 611, 612, 613, 614 and 633 contain computing hardware, and programmable memories, of various types.

The information (such as data and/or instructions) stored on computer-readable media or programmable memories can be accessed through the use of computer-readable code devices embodied therein. A computer-readable code device can represent that portion of a device wherein a defined unit of information (such as a bit) is stored and/or read.

5 Glossary of Selected Terms

Demographic:
a. Any characteristic that can be meaningfully summarized with respect to a population. Examples:
  i. Gender
  ii. Age
  iii. Affluence
b. Such summarization is usually expressed by a statistical measure. Examples:
  i. Average or Net value
  ii. % (or amount), of total, for each value (or range of values) of characteristic Source Corpus: Unless the context indicates otherwise, refers to a corpus of natural language that is to be the subject of linguistic analysis (e.g., a search for frame instances, or a search for co-occurrences).

UNL: Refers to a "unit of natural language" in a corpus of human language. The term "UNL" can be used to refer to any unit of a natural language. Some example UNL's, that are associated with linguistic structure, include: clause, sentence, paragraph, documents. However, a UNL can refer to a unit that is of arbitrary length or that is not associated with any general linguistic structure. The UNL focused upon herein is the single sentence or clause.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A method for graphically presenting data, comprising:
identifying in a first corpus that includes natural language, as a result of a configuration of computing hardware and programmable memory, a first set of occurrences of a first item, wherein the first item is a first brand of products;
identifying in the first corpus, as a result of a configuration of computing hardware and programmable memory, a second set of occurrences of a second item, wherein the second item is a second brand of products, and;
identifying in the first corpus, as a result of a configuration of computing hardware and programmable memory, a third set of occurrences of a third item, wherein the third item is a third brand of products, and each of the first, second and third brands is in competition with the other two brands;
identifying, as a result of a configuration of computing hardware and programmable memory, a first set of co-occurrences of the first and second items, where each co-occurrence indicates both the second and third items occurring within a common unit of natural language;
identifying, as a result of a configuration of computing hardware and programmable memory, a second set of co-occurrences of the second and third items, where each co-occurrence indicates both the second and third items occurring within a common unit of natural language;

graphically displaying a first node, as a result of a configuration of computing hardware and programmable memory, in a way that is representative of the first set of occurrences;

graphically displaying a second node, as a result of a configuration of computing hardware and programmable memory, in a way that is representative of the second set of occurrences;

graphically displaying a third node, as a result of a configuration of computing hardware and programmable memory, in a way that is representative of the third set of occurrences;

graphically displaying a first edge, as a result of a configuration of computing hardware and programmable memory, connective of the first and second nodes, in a way that is representative of the first set of co-occurrences;

graphically displaying a second edge, as a result of a configuration of computing hardware and programmable memory, connective of the second and third nodes, in a way that is representative of the second set of co-occurrences;

determining a first occurrence number, equal to a number of occurrences in the first set of occurrences;

determining a second occurrence number, equal to a number of occurrences in the second set of occurrences;

determining a third occurrence number, equal to a number of occurrences in the third set of occurrences;

determining a first co-occurrence number, equal to a number of co-occurrences in the first set of co-occurrences;

determining a second co-occurrence number, equal to a number of co-occurrences in the second set of co-occurrences;

graphically displaying the first edge as both a first directional edge, from the first node to the second node, and as a second directional edge, from the second node to the first node;

graphically displaying the first directional edge, as a function of a first ratio of the first co-occurrences number divided by the first occurrences number;

graphically displaying the second directional edge, as a function of a second ratio of the first co-occurrences number divided by the second occurrences number;

graphically displaying the second edge as both a third directional edge, from the second node to the third node, and as a fourth directional edge, from the third node to the second node;

graphically displaying the third directional edge, as a function of a third ratio of the second co-occurrences number divided by the second occurrences number;

graphically displaying the fourth directional edge, as a function of a fourth ratio of the second co-occurrences number divided by the third occurrences number;

simulating the first, second, third, and fourth directional edges as each producing, between its pair of nodes, an attractive force that is a function of, respectively, the first, second, third, and fourth ratios; and simulating the first, second, and third nodes as each producing a force that causes each node to repel all other nodes.

2. The method of claim 1, further comprising:

graphically displaying the first node, in a way that relies upon a first node function, and the first node function has, as an input, the first occurrence number;

graphically displaying the second node, in a way that relies upon a second node function, and the second node function has, as an input, the second occurrence number;

graphically displaying the third node, in a way that relies upon a third node function, and the third node function has, as an input, the third occurrence number;

graphically displaying the first edge, in a way that relies upon a first edge function, and the first edge function has, as an input, the first co-occurrence number;

graphically displaying the second edge, in a way that relies upon a second edge function, and the second edge function has, as an input, the second co-occurrence number.

3. The method of claim 2, further comprising:

displaying the first node with a radius that is dependent upon the first node function.

4. The method of claim 3, further comprising:

determining, by the first node function, a log of the first occurrence number.

5. The method of claim 3, further comprising:

determining, by the first node function, a scaled value of the first occurrence number.

6. The method of claim 2, further comprising:

displaying the first edge with a thickness that is dependent upon the first edge function.

7. The method of claim 6, further comprising:

determining, by the first edge function, a log of the first co-occurrence number.

8. The method of claim 6, further comprising:

determining, by the first edge function, a scaled value of the first co-occurrence number.

9. The method of claim 1, further comprising:

selecting the first node of a first graph;

determining a first edge set, containing those edges directly connected to the first node;

determining a first node set, containing those nodes directly connected to the first edge set;

graphically emphasizing, with respect to any remaining portion of the first graph, the first node, the first node set, and the first edge set.

10. The method of claim 1, further comprising:

determining a first set of units of natural language, wherein each element of the set is a unit of natural language in which the first item occurs;

determining a first sub-set of the first set of units of natural language, wherein each element of the sub-set has an instance, triggered by its unit of natural language, and the instance describes a first property of the first item as having a value;

determining a first net value, of the first property of the first item, from the values of the first sub-set;

mapping the first net value to a graphical representation and displaying the first node in accordance with the graphical representation.

11. The method of claim 1, further comprising:

determining a first set of units of natural language, wherein each element of the first set is a unit of natural language in which the first item occurs;

determining, for each element of the first set of units of natural language, its value in accordance with a certain first demographic;

determining a first net demographic value, in accordance with the values assigned for the first set of units of natural language;

mapping the first net demographic value to a graphical representation and displaying the first node in accordance with the graphical representation.

* * * * *